(12) United States Patent  
Crocker et al.

(10) Patent No.: US 7,930,756 B1  
(45) Date of Patent: Apr. 19, 2011

(54) MULTI-LEVEL CRYPTOGRAPHIC TRANSFORMATIONS FOR SECURING DIGITAL ASSETS

(76) Inventors: Steven Toye Crocker, Redwood City, CA (US); Denis Jacques Paul Garcia, Palo Alto, CA (US)

( * ) Notice: Subject to any disclaimer, the term of this patent is extended or adjusted under 35 U.S.C. 154(b) by 1490 days.

(21) Appl. No.: 10/404,566

(22) Filed: Mar. 31, 2003

Related U.S. Application Data

(63) Continuation-in-part of application No. 10/074,804, filed on Feb. 12, 2002, now Pat. No. 7,380,120.

(60) Provisional application No. 60/339,634, filed on Dec. 12, 2001.

(51) Int. Cl.
*G06F 12/14* (2006.01)
*G06F 21/22* (2006.01)
*G06F 21/24* (2006.01)

(52) U.S. Cl. ............... 726/27; 726/26; 726/28; 726/29; 726/30; 705/57

(58) Field of Classification Search ............... 713/160
See application file for complete search history.

(56) References Cited

U.S. PATENT DOCUMENTS

| | | | |
|---|---|---|---|
| 4,203,166 A | 5/1980 | Ehrsam et al. |
| 4,238,854 A | 12/1980 | Ehrsam et al. |
| 4,423,387 A | 12/1983 | Zeidler |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,887,204 A | 12/1989 | Johnson et al. |
| 4,888,800 A | 12/1989 | Marshall et al. |
| 4,912,552 A | 3/1990 | Allison et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,212,788 A | 5/1993 | Lomet et al. |
| 5,220,657 A | 6/1993 | Bly et al. |

(Continued)

FOREIGN PATENT DOCUMENTS

EP 0 672 991 A2 9/1995

(Continued)

OTHER PUBLICATIONS

Microsoft Windows 2000 Server. Windows 2000 Group Policy White Paper, 2000.

(Continued)

*Primary Examiner* — Jung Kim
(74) *Attorney, Agent, or Firm* — Sterne, Kessler, Goldstein & Fox PLLC

(57) ABSTRACT

Enhanced multi-level cryptographic transformations that secure electronic files are disclosed. The secured electronic files contain not only secured data but also security information. The security information includes cryptographic structure information, access rules and secrets (e.g., keys). The cryptographic structure information explains the multi-level cryptographic transformations associated with securing or unsecuring the electronic files. The access rules and the secrets are used by the cryptographic transformations to secure the electronic files. Since the secured electronic files contain the cryptographic structure information, the particular cryptographic transformations (including their sequencing) can vary with each electronic file, if so desired. Typically, the secured electronic files are secured and managed by a file security system, such as a distributed security system.

35 Claims, 13 Drawing Sheets

U.S. PATENT DOCUMENTS

| | | | |
|---|---|---|---|
| 5,235,641 A | 8/1993 | Nozawa et al. | |
| 5,247,575 A | 9/1993 | Sprague et al. | |
| 5,267,313 A | 11/1993 | Hirata | |
| 5,276,735 A | 1/1994 | Boebert et al. | |
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A * | 5/1995 | Kramer et al. | 718/104 |
| 5,434,918 A | 7/1995 | Kung et al. | |
| 5,461,710 A | 10/1995 | Bloomfield et al. | |
| 5,467,342 A | 11/1995 | Logston et al. | |
| 5,495,533 A * | 2/1996 | Linehan et al. | 713/155 |
| 5,497,422 A | 3/1996 | Tysen et al. | |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,619,576 A | 4/1997 | Shaw | |
| 5,638,501 A | 6/1997 | Gough et al. | |
| 5,640,388 A | 6/1997 | Woodhead et al. | |
| 5,655,119 A | 8/1997 | Davy | |
| 5,661,668 A | 8/1997 | Yemini et al. | |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,682,537 A | 10/1997 | Davies et al. | |
| 5,684,987 A | 11/1997 | Mamiya et al. | |
| 5,689,688 A | 11/1997 | Strong et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,719,941 A | 2/1998 | Swift et al. | |
| 5,720,033 A | 2/1998 | Deo | |
| 5,729,734 A | 3/1998 | Parker et al. | |
| 5,732,265 A | 3/1998 | Dewitt et al. | |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,768,381 A | 6/1998 | Hawthorne | |
| 5,778,065 A | 7/1998 | Hauser et al. | |
| 5,778,350 A | 7/1998 | Adams et al. | |
| 5,781,711 A | 7/1998 | Austin et al. | |
| 5,787,169 A | 7/1998 | Eldridge et al. | |
| 5,787,173 A | 7/1998 | Seheidt et al. | |
| 5,787,175 A * | 7/1998 | Carter | 713/165 |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,850,443 A | 12/1998 | Van Oorschot et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schneck et al. | |
| 5,944,794 A | 8/1999 | Okamoto et al. | |
| 5,953,419 A * | 9/1999 | Lohstroh et al. | 713/165 |
| 5,968,177 A | 10/1999 | Batten-Carew et al. | |
| 5,970,502 A | 10/1999 | Salkewicz et al. | |
| 5,978,802 A | 11/1999 | Hurvig | |
| 5,987,440 A | 11/1999 | O'Neil et al. | |
| 5,991,879 A | 11/1999 | Still | |
| 5,999,907 A | 12/1999 | Donner | |
| 6,011,847 A | 1/2000 | Follendore, III | |
| 6,014,730 A | 1/2000 | Ohtsu | |
| 6,023,506 A | 2/2000 | Ote et al. | |
| 6,031,584 A | 2/2000 | Gray | |
| 6,032,216 A | 2/2000 | Schmuck et al. | |
| 6,035,404 A | 3/2000 | Zhao | |
| 6,038,322 A | 3/2000 | Harkins | |
| 6,044,155 A * | 3/2000 | Thomlinson et al. | 713/155 |
| 6,055,314 A | 4/2000 | Spies et al. | |
| 6,058,424 A | 5/2000 | Dixon et al. | |
| 6,061,790 A | 5/2000 | Bodnar | |
| 6,069,957 A * | 5/2000 | Richards | 380/281 |
| 6,070,244 A | 5/2000 | Orchier et al. | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A | 8/2000 | Cane et al. | |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili et al. | |
| 6,148,338 A | 11/2000 | Lachelt et al. | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,199,070 B1 | 3/2001 | Polo-Wood et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold | |
| 6,240,188 B1 | 5/2001 | Dondeti et al. | |
| 6,249,755 B1 | 6/2001 | Yemini et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 | 7/2001 | Kathrow et al. | |
| 6,266,420 B1 | 7/2001 | Langford et al. | |
| 6,272,631 B1 | 8/2001 | Thomlinson et al. | |
| 6,272,632 B1 | 8/2001 | Carman et al. | |
| 6,282,649 B1 | 8/2001 | Lambert et al. | |
| 6,289,450 B1 * | 9/2001 | Pensak et al. | 713/167 |
| 6,289,458 B1 | 9/2001 | Garg et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,299,069 B1 | 10/2001 | Shona | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,408 B1 | 11/2001 | Salas et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |

| Patent | Type | Date | Inventor |
|---|---|---|---|
| 6,357,010 | B1 | 3/2002 | Viets et al. |
| 6,363,480 | B1 | 3/2002 | Perlman |
| 6,366,298 | B1 | 4/2002 | Haitsuka et al. |
| 6,370,249 | B1 | 4/2002 | Van Oorschot |
| 6,381,698 | B1 | 4/2002 | Devanbu et al. |
| 6,385,644 | B1 | 5/2002 | Devine et al. |
| 6,389,433 | B1 | 5/2002 | Bolosky et al. |
| 6,389,538 | B1 | 5/2002 | Gruse et al. |
| 6,393,420 | B1 | 5/2002 | Peters |
| 6,405,315 | B1 | 6/2002 | Burns et al. |
| 6,405,318 | B1 | 6/2002 | Rowland |
| 6,408,404 | B1 | 6/2002 | Ladwig |
| 6,421,714 | B1 | 7/2002 | Rai et al. |
| 6,442,688 | B1 | 8/2002 | Moses et al. |
| 6,442,695 | B1 | 8/2002 | Dutcher et al. |
| 6,446,090 | B1 | 9/2002 | Hart |
| 6,449,721 | B1 | 9/2002 | Pensak et al. |
| 6,453,353 | B1 | 9/2002 | Win et al. |
| 6,453,419 | B1 | 9/2002 | Flint et al. |
| 6,466,476 | B1 | 10/2002 | Wong et al. |
| 6,466,932 | B1 | 10/2002 | Dennis et al. |
| 6,477,544 | B1 | 11/2002 | Bolosky et al. |
| 6,487,662 | B1 | 11/2002 | Kharon et al. |
| 6,490,680 | B1 | 12/2002 | Scheidt et al. |
| 6,505,300 | B2 | 1/2003 | Chan et al. |
| 6,510,349 | B1 | 1/2003 | Schneck et al. |
| 6,519,700 | B1 * | 2/2003 | Ram et al. ............. 713/193 |
| 6,529,956 | B1 | 3/2003 | Smith et al. |
| 6,530,020 | B1 | 3/2003 | Aoki |
| 6,530,024 | B1 | 3/2003 | Proctor |
| 6,542,608 | B2 | 4/2003 | Scheidt et al. |
| 6,549,623 | B1 | 4/2003 | Scheidt et al. |
| 6,550,011 | B1 | 4/2003 | Sims |
| 6,557,039 | B1 | 4/2003 | Leong et al. |
| 6,567,914 | B1 | 5/2003 | Just et al. |
| 6,571,291 | B1 | 5/2003 | Chow |
| 6,574,733 | B1 | 6/2003 | Langford |
| 6,584,466 | B1 | 6/2003 | Serbinis et al. |
| 6,587,878 | B1 | 7/2003 | Merriam |
| 6,587,946 | B1 | 7/2003 | Jakobsson |
| 6,588,673 | B1 | 7/2003 | Chan et al. |
| 6,591,295 | B1 | 7/2003 | Diamond et al. |
| 6,594,662 | B1 | 7/2003 | Sleffert et al. |
| 6,598,161 | B1 * | 7/2003 | Kluttz et al. ............. 713/166 |
| 6,601,170 | B1 | 7/2003 | Wallace, Jr. |
| 6,603,857 | B1 | 8/2003 | Batten-Carew et al. |
| 6,608,636 | B1 | 8/2003 | Roseman |
| 6,611,599 | B2 | 8/2003 | Natarajan |
| 6,611,846 | B1 | 8/2003 | Stoodley |
| 6,615,349 | B1 | 9/2003 | Hair |
| 6,615,350 | B1 | 9/2003 | Schell et al. |
| 6,625,650 | B2 | 9/2003 | Stelliga |
| 6,625,734 | B1 | 9/2003 | Marvit et al. |
| 6,629,140 | B1 | 9/2003 | Fertell et al. |
| 6,629,243 | B1 | 9/2003 | Kleinman et al. |
| 6,633,311 | B1 | 10/2003 | Douvikas et al. |
| 6,640,307 | B2 | 10/2003 | Viets et al. |
| 6,646,515 | B2 | 11/2003 | Jun et al. |
| 6,647,388 | B2 | 11/2003 | Numao et al. |
| 6,678,835 | B1 | 1/2004 | Shah et al. |
| 6,683,954 | B1 | 1/2004 | Searle et al. |
| 6,687,822 | B1 | 2/2004 | Jakobsson |
| 6,693,652 | B1 | 2/2004 | Barrus et al. |
| 6,698,022 | B1 | 2/2004 | Wu |
| 6,711,683 | B1 | 3/2004 | Laczko et al. |
| 6,718,361 | B1 | 4/2004 | Basani et al. |
| 6,735,701 | B1 | 5/2004 | Jacobson |
| 6,738,908 | B1 | 5/2004 | Bonn et al. |
| 6,751,573 | B1 | 6/2004 | Burch |
| 6,754,657 | B2 | 6/2004 | Lomet |
| 6,754,665 | B1 | 6/2004 | Futagami et al. |
| 6,775,779 | B1 | 8/2004 | England et al. |
| 6,779,031 | B1 | 8/2004 | Picher-Dempsey |
| 6,782,403 | B1 | 8/2004 | Kino et al. |
| 6,801,999 | B1 | 10/2004 | Venkatesan et al. |
| 6,807,534 | B1 | 10/2004 | Erickson |
| 6,807,636 | B2 | 10/2004 | Hartman et al. |
| 6,810,389 | B1 | 10/2004 | Meyer |
| 6,810,479 | B1 | 10/2004 | Barlow et al. |
| 6,816,871 | B2 | 11/2004 | Lee |
| 6,816,969 | B2 | 11/2004 | Miyazaki et al. |
| 6,826,698 | B1 | 11/2004 | Minkin et al. |
| 6,834,333 | B2 * | 12/2004 | Yoshino et al. ............. 711/163 |
| 6,834,341 | B1 | 12/2004 | Bahl et al. |
| 6,842,825 | B2 | 1/2005 | Geiner et al. |
| 6,845,452 | B1 | 1/2005 | Roddy et al. |
| 6,851,050 | B2 | 2/2005 | Singhal et al. |
| 6,862,103 | B1 | 3/2005 | Miura et al. |
| 6,865,555 | B2 | 3/2005 | Novak |
| 6,870,920 | B2 | 3/2005 | Henits |
| 6,874,139 | B2 | 3/2005 | Krueger et al. |
| 6,877,010 | B2 | 4/2005 | Smith-Semedo et al. |
| 6,877,136 | B2 | 4/2005 | Bess et al. |
| 6,882,994 | B2 | 4/2005 | Yoshimura et al. |
| 6,889,210 | B1 | 5/2005 | Vainstein |
| 6,891,953 | B1 | 5/2005 | DeMello et al. |
| 6,892,201 | B2 | 5/2005 | Brown et al. |
| 6,892,306 | B1 | 5/2005 | En-Seung et al. |
| 6,898,627 | B1 | 5/2005 | Sekiguchi |
| 6,907,034 | B1 | 6/2005 | Begis |
| 6,909,708 | B1 | 6/2005 | Krishnaswamy et al. |
| 6,915,425 | B2 | 7/2005 | Xu et al. |
| 6,915,434 | B1 | 7/2005 | Kuroda et al. |
| 6,915,435 | B1 | 7/2005 | Merriam |
| 6,920,558 | B2 | 7/2005 | Sames et al. |
| 6,922,785 | B1 | 7/2005 | Brewer et al. |
| 6,924,425 | B2 | 8/2005 | Naples et al. |
| 6,931,450 | B2 | 8/2005 | Howard et al. |
| 6,931,530 | B2 | 8/2005 | Pham et al. |
| 6,931,597 | B1 | 8/2005 | Prakash |
| 6,938,042 | B2 | 8/2005 | Aboulhosn et al. |
| 6,938,156 | B2 | 8/2005 | Wheeler et al. |
| 6,941,355 | B1 | 9/2005 | Donaghey et al. |
| 6,941,456 | B2 | 9/2005 | Wilson |
| 6,941,472 | B2 | 9/2005 | Moriconi et al. |
| 6,944,183 | B1 | 9/2005 | Iyer et al. |
| 6,947,556 | B1 | 9/2005 | Matyas, Jr. et al. |
| 6,950,818 | B2 | 9/2005 | Dennis et al. |
| 6,950,936 | B2 | 9/2005 | Subramaniam et al. |
| 6,950,941 | B1 | 9/2005 | Lee et al. |
| 6,950,943 | B1 | 9/2005 | Bacha et al. |
| 6,952,780 | B2 | 10/2005 | Olsen et al. |
| 6,957,261 | B2 | 10/2005 | Lortz |
| 6,959,308 | B2 | 10/2005 | Gramsamer et al. |
| 6,961,849 | B1 | 11/2005 | Davis et al. |
| 6,961,855 | B1 | 11/2005 | Rich et al. |
| 6,968,060 | B1 | 11/2005 | Pinkas |
| 6,968,456 | B1 | 11/2005 | Tripathi et al. |
| 6,971,018 | B1 | 11/2005 | Witt et al. |
| 6,976,259 | B1 | 12/2005 | Dutta et al. |
| 6,978,366 | B1 | 12/2005 | Ignatchenko et al. |
| 6,978,376 | B2 | 12/2005 | Giroux et al. |
| 6,978,377 | B1 | 12/2005 | Asano et al. |
| 6,987,752 | B1 | 1/2006 | Falco et al. |
| 6,988,133 | B1 | 1/2006 | Zavalkovsky et al. |
| 6,988,199 | B2 | 1/2006 | Toh et al. |
| 6,990,441 | B1 | 1/2006 | Bolme et al. |
| 6,993,135 | B2 | 1/2006 | Ishibashi |
| 6,996,718 | B1 | 2/2006 | Henry et al. |
| 7,000,150 | B1 | 2/2006 | Zunino et al. |
| 7,003,116 | B2 | 2/2006 | Riedel et al. |
| 7,003,117 | B2 | 2/2006 | Kacker et al. |
| 7,003,560 | B1 | 2/2006 | Mullen et al. |
| 7,003,661 | B2 | 2/2006 | Beattie et al. |
| 7,010,689 | B1 | 3/2006 | Matyas et al. |
| 7,010,809 | B2 | 3/2006 | Hori et al. |
| 7,013,332 | B2 | 3/2006 | Friedel et al. |
| 7,013,485 | B2 | 3/2006 | Brown et al. |
| 7,020,645 | B2 | 3/2006 | Bisbee et al. |
| 7,024,427 | B2 | 4/2006 | Bobbitt et al. |
| 7,035,854 | B2 | 4/2006 | Hsiao et al. |
| 7,035,910 | B1 | 4/2006 | Dutta et al. |
| 7,043,637 | B2 | 5/2006 | Bolosky et al. |
| 7,046,807 | B2 | 5/2006 | Hirano et al. |
| 7,047,404 | B1 | 5/2006 | Doonan et al. |
| 7,051,213 | B1 | 5/2006 | Kobayashi et al. |
| 7,058,696 | B1 | 6/2006 | Phillips et al. |
| 7,058,978 | B2 | 6/2006 | Feuerstein et al. |

| Patent | Date | Inventor |
|---|---|---|
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Takuya |
| 7,096,266 B2 | 8/2006 | Lewin et al. |
| 7,099,926 B1 | 8/2006 | Ims et al. |
| 7,103,911 B2 | 9/2006 | Spies et al. |
| 7,107,185 B1 | 9/2006 | Yemini et al. |
| 7,107,269 B2 | 9/2006 | Arlein et al. |
| 7,107,416 B2 | 9/2006 | Stuart et al. |
| 7,113,594 B2 | 9/2006 | Boneh et al. |
| 7,116,785 B2 | 10/2006 | Okaue |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,126,957 B1 | 10/2006 | Isukapalli et al. |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,139,399 B1 | 11/2006 | Zimmermann |
| 7,140,044 B2 | 11/2006 | Redlich et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,168,094 B1 | 1/2007 | Fredell |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,177,839 B1 | 2/2007 | Claxton et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,197,638 B1 | 3/2007 | Grawrock et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,249,251 B2 | 7/2007 | Todd et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,281,272 B1 | 10/2007 | Rubin et al. |
| 7,287,055 B2 | 10/2007 | Smith et al. |
| 7,287,058 B2 | 10/2007 | Loveland et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,340,600 B1 | 3/2008 | Corella |
| 7,343,488 B2 | 3/2008 | Yadav |
| 7,359,517 B1 * | 4/2008 | Rowe ............................ 380/284 |
| 7,362,868 B2 | 4/2008 | Madoukh et al. |
| 7,380,120 B1 | 5/2008 | Garcia |
| 7,383,586 B2 | 6/2008 | Cross et al. |
| 7,386,529 B2 | 6/2008 | Kiessig et al. |
| 7,386,599 B1 | 6/2008 | Piersol et al. |
| 7,401,220 B2 * | 7/2008 | Bolosky et al. ............... 713/165 |
| 7,406,596 B2 | 7/2008 | Tararukhina et al. |
| 7,415,608 B2 | 8/2008 | Bolosky et al. |
| 7,434,048 B1 | 10/2008 | Shapiro et al. |
| 7,454,612 B2 | 11/2008 | Bolosky et al. |
| 7,461,157 B2 | 12/2008 | Ahlard et al. |
| 7,461,405 B2 | 12/2008 | Boudreault et al. |
| 7,478,243 B2 | 1/2009 | Bolosky et al. |
| 7,478,418 B2 | 1/2009 | Supramaniam et al. |
| 7,484,245 B1 | 1/2009 | Friedman et al. |
| 7,496,959 B2 | 2/2009 | Adelstein et al. |
| 7,509,492 B2 | 3/2009 | Boyen et al. |
| 7,512,810 B1 | 3/2009 | Ryan |
| 7,539,867 B2 | 5/2009 | Bolosky et al. |
| 7,555,558 B1 | 6/2009 | Kenrich et al. |
| 7,562,232 B2 | 7/2009 | Zuili et al. |
| 7,565,683 B1 | 7/2009 | Huang et al. |
| 7,631,184 B2 | 12/2009 | Ryan |
| 7,681,034 B1 | 3/2010 | Lee et al. |
| 7,698,230 B1 | 4/2010 | Brown et al. |
| 7,702,909 B2 | 4/2010 | Vainstein |
| 7,703,140 B2 | 4/2010 | Nath et al. |
| 7,707,427 B1 | 4/2010 | Kenrich et al. |
| 7,729,995 B1 | 6/2010 | Zheng et al. |
| 7,730,543 B1 | 6/2010 | Nath |
| 7,748,045 B2 | 6/2010 | Kenrich et al. |
| 2001/0000265 A1 | 4/2001 | Schreiber et al. |
| 2001/0011254 A1 | 8/2001 | Clark |
| 2001/0018743 A1 | 8/2001 | Takuya |
| 2001/0021255 A1 | 9/2001 | Ishibashi |
| 2001/0021926 A1 * | 9/2001 | Schneck et al. ................ 705/54 |
| 2001/0023421 A1 * | 9/2001 | Numao et al. ..................... 707/9 |
| 2001/0032181 A1 | 10/2001 | Jakstadt et al. |
| 2001/0033611 A1 | 10/2001 | Grimwood et al. |
| 2001/0034839 A1 | 10/2001 | Karjoth et al. |
| 2001/0042110 A1 | 11/2001 | Furusawa et al. |
| 2001/0044903 A1 | 11/2001 | Yamamoto et al. |
| 2001/0056541 A1 | 12/2001 | Matsuzaki et al. |
| 2001/0056550 A1 | 12/2001 | Lee |
| 2002/0003886 A1 | 1/2002 | Hillegass et al. |
| 2002/0007335 A1 | 1/2002 | Millard et al. |
| 2002/0010679 A1 | 1/2002 | Felsher |
| 2002/0013772 A1 | 1/2002 | Peinado |
| 2002/0016921 A1 | 2/2002 | Olsen et al. |
| 2002/0016922 A1 | 2/2002 | Richards et al. |
| 2002/0023208 A1 | 2/2002 | Jancula |
| 2002/0026321 A1 | 2/2002 | Faris et al. |
| 2002/0027886 A1 | 3/2002 | Fischer et al. |
| 2002/0029340 A1 | 3/2002 | Pensak et al. |
| 2002/0031230 A1 | 3/2002 | Sweet et al. |
| 2002/0035624 A1 | 3/2002 | Kim |
| 2002/0036984 A1 | 3/2002 | Chiussi et al. |
| 2002/0041391 A1 | 4/2002 | Bannai |
| 2002/0042756 A1 | 4/2002 | Kumar et al. |
| 2002/0046350 A1 | 4/2002 | Lordemann et al. |
| 2002/0050098 A1 | 5/2002 | Chan |
| 2002/0052981 A1 | 5/2002 | Yasuda |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0062451 A1 | 5/2002 | Scheidt et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0078239 A1 | 6/2002 | Howard et al. |
| 2002/0078361 A1 | 6/2002 | Giroux et al. |
| 2002/0087479 A1 | 7/2002 | Malcolm |
| 2002/0091532 A1 | 7/2002 | Viets et al. |
| 2002/0091745 A1 | 7/2002 | Ramamurthy et al. |
| 2002/0091928 A1 | 7/2002 | Bouchard et al. |
| 2002/0093527 A1 | 7/2002 | Sherlock et al. |
| 2002/0099947 A1 | 7/2002 | Evans |
| 2002/0112035 A1 | 8/2002 | Carey et al. |
| 2002/0112048 A1 | 8/2002 | Gruyer et al. |
| 2002/0120851 A1 | 8/2002 | Clarke |
| 2002/0124180 A1 | 9/2002 | Hagman |
| 2002/0129158 A1 | 9/2002 | Zhang et al. |
| 2002/0129235 A1 | 9/2002 | Okamoto et al. |
| 2002/0133500 A1 | 9/2002 | Arlein et al. |
| 2002/0133699 A1 | 9/2002 | Pueschel |
| 2002/0138571 A1 | 9/2002 | Trinon et al. |
| 2002/0138726 A1 | 9/2002 | Samson et al. |

| | | | | | | |
|---|---|---|---|---|---|---|
| 2002/0138762 A1 | 9/2002 | Horne | | 2003/0191938 A1 | 10/2003 | Woods et al. |
| 2002/0143710 A1 | 10/2002 | Liu | | 2003/0196096 A1 | 10/2003 | Sutton |
| 2002/0143906 A1 | 10/2002 | Tormasov et al. | | 2003/0197729 A1 | 10/2003 | Denoue et al. |
| 2002/0150239 A1 | 10/2002 | Carny et al. | | 2003/0200202 A1 | 10/2003 | Hsiao et al. |
| 2002/0152302 A1 | 10/2002 | Motoyama et al. | | 2003/0204692 A1 | 10/2003 | Tamer et al. |
| 2002/0156726 A1 | 10/2002 | Kleckner et al. | | 2003/0208485 A1 | 11/2003 | Miyazaki et al. |
| 2002/0157016 A1 | 10/2002 | Russell et al. | | 2003/0217264 A1 | 11/2003 | Martin et al. |
| 2002/0162104 A1 | 10/2002 | Raike et al. | | 2003/0217281 A1 | 11/2003 | Ryan |
| 2002/0165870 A1 | 11/2002 | Chakraborty et al. | | 2003/0217282 A1 | 11/2003 | Henry |
| 2002/0166053 A1 | 11/2002 | Wilson | | 2003/0217333 A1 | 11/2003 | Smith et al. |
| 2002/0169963 A1 | 11/2002 | Seder et al. | | 2003/0220999 A1 | 11/2003 | Emerson |
| 2002/0169965 A1 | 11/2002 | Hale et al. | | 2003/0222141 A1 | 12/2003 | Vogler et al. |
| 2002/0172367 A1 | 11/2002 | Mulder et al. | | 2003/0226013 A1 | 12/2003 | Dutertre |
| 2002/0174030 A1 | 11/2002 | Praisner et al. | | 2003/0233650 A1 | 12/2003 | Zaner et al. |
| 2002/0174109 A1 | 11/2002 | Chandy et al. | | 2004/0022390 A1 | 2/2004 | McDonald et al. |
| 2002/0174415 A1 | 11/2002 | Hines | | 2004/0025037 A1 | 2/2004 | Hair |
| 2002/0176572 A1 | 11/2002 | Ananth | | 2004/0039781 A1 | 2/2004 | LaVallee et al. |
| 2002/0178271 A1 | 11/2002 | Graham et al. | | 2004/0041845 A1 | 3/2004 | Alben et al. |
| 2002/0184217 A1 | 12/2002 | Bisbee et al. | | 2004/0049702 A1 | 3/2004 | Subramaniam et al. |
| 2002/0184488 A1 | 12/2002 | Amini et al. | | 2004/0064507 A1 | 4/2004 | Sakata et al. |
| 2002/0194484 A1 | 12/2002 | Bolosky et al. | | 2004/0064710 A1 | 4/2004 | Vainstein |
| 2002/0198798 A1 | 12/2002 | Ludwig et al. | | 2004/0068524 A1 | 4/2004 | Aboulhosn et al. |
| 2003/0005168 A1 | 1/2003 | Leerssen et al. | | 2004/0068664 A1 | 4/2004 | Nachenberg et al. |
| 2003/0009685 A1 | 1/2003 | Choo et al. | | 2004/0073660 A1 | 4/2004 | Toomey |
| 2003/0014391 A1 | 1/2003 | Evans et al. | | 2004/0073718 A1 | 4/2004 | Johannessen et al. |
| 2003/0023559 A1 | 1/2003 | Choi et al. | | 2004/0088548 A1 | 5/2004 | Smetters et al. |
| 2003/0026431 A1 | 2/2003 | Hammersmith | | 2004/0098580 A1 | 5/2004 | DeTreville |
| 2003/0028610 A1 | 2/2003 | Pearson | | 2004/0103202 A1 | 5/2004 | Hildebrand et al. |
| 2003/0033528 A1 | 2/2003 | Ozog et al. | | 2004/0103280 A1 | 5/2004 | Balfanz et al. |
| 2003/0037029 A1 | 2/2003 | Holenstein et al. | | 2004/0117371 A1 | 6/2004 | Bhide et al. |
| 2003/0037133 A1 | 2/2003 | Owens | | 2004/0131191 A1 | 7/2004 | Chen et al. |
| 2003/0037237 A1 | 2/2003 | Abgrall et al. | | 2004/0133544 A1 | 7/2004 | Kiessig et al. |
| 2003/0037253 A1 | 2/2003 | Blank et al. | | 2004/0158586 A1 | 8/2004 | Tsai |
| 2003/0046176 A1 | 3/2003 | Hynes | | 2004/0186845 A1 | 9/2004 | Fukui |
| 2003/0046238 A1 | 3/2003 | Nonaka et al. | | 2004/0193602 A1 | 9/2004 | Liu et al. |
| 2003/0046270 A1 | 3/2003 | Leung et al. | | 2004/0193905 A1 | 9/2004 | Lirov et al. |
| 2003/0050919 A1 | 3/2003 | Brown et al. | | 2004/0193912 A1 | 9/2004 | Li et al. |
| 2003/0051039 A1 | 3/2003 | Brown et al. | | 2004/0199514 A1 | 10/2004 | Rosenblatt et al. |
| 2003/0056139 A1 | 3/2003 | Murray et al. | | 2004/0205576 A1 | 10/2004 | Chikirivao et al. |
| 2003/0061482 A1 | 3/2003 | Emmerichs | | 2004/0215956 A1 | 10/2004 | Venkatachary et al. |
| 2003/0061506 A1 | 3/2003 | Cooper | | 2004/0215962 A1 | 10/2004 | Douceur et al. |
| 2003/0074580 A1 | 4/2003 | Knouse et al. | | 2004/0243853 A1 | 12/2004 | Swander et al. |
| 2003/0078959 A1 | 4/2003 | Yeung et al. | | 2004/0254884 A1 | 12/2004 | Haber et al. |
| 2003/0079175 A1 | 4/2003 | Limantsev | | 2005/0021467 A1 | 1/2005 | Franzdonk |
| 2003/0081784 A1 | 5/2003 | Kallahalla et al. | | 2005/0021629 A1 | 1/2005 | Cannata et al. |
| 2003/0081785 A1 | 5/2003 | Boneh et al. | | 2005/0028006 A1 | 2/2005 | Leser et al. |
| 2003/0081787 A1 | 5/2003 | Kallahalla et al. | | 2005/0039034 A1 | 2/2005 | Doyle et al. |
| 2003/0081790 A1 | 5/2003 | Kallahalla et al. | | 2005/0050098 A1 | 3/2005 | Barnett |
| 2003/0088517 A1 | 5/2003 | Medoff | | 2005/0071275 A1 | 3/2005 | Vainstein et al. |
| 2003/0088783 A1 | 5/2003 | DiPierro | | 2005/0071657 A1 | 3/2005 | Ryan |
| 2003/0093457 A1 | 5/2003 | Goldick | | 2005/0071658 A1 | 3/2005 | Nath et al. |
| 2003/0095552 A1 | 5/2003 | Bernhard et al. | | 2005/0081029 A1 | 4/2005 | Thornton et al. |
| 2003/0099248 A1 | 5/2003 | Speciner | | 2005/0086531 A1 | 4/2005 | Kenrich |
| 2003/0101072 A1 | 5/2003 | Dick et al. | | 2005/0091289 A1 | 4/2005 | Shappell et al. |
| 2003/0110169 A1 | 6/2003 | Zuili | | 2005/0091484 A1 | 4/2005 | Thornton et al. |
| 2003/0110266 A1 | 6/2003 | Rollins et al. | | 2005/0097061 A1 | 5/2005 | Shapiro et al. |
| 2003/0110280 A1 | 6/2003 | Hinchliffe et al. | | 2005/0120199 A1 | 6/2005 | Carter |
| 2003/0110397 A1 | 6/2003 | Supramaniam | | 2005/0138371 A1 | 6/2005 | Supramaniam |
| 2003/0115146 A1 | 6/2003 | Lee et al. | | 2005/0138383 A1 | 6/2005 | Vainstein |
| 2003/0115218 A1 | 6/2003 | Bobbitt et al. | | 2005/0168766 A1 | 8/2005 | Troyansky et al. |
| 2003/0115570 A1 | 6/2003 | Bisceglia | | 2005/0177716 A1 | 8/2005 | Ginter et al. |
| 2003/0120601 A1 | 6/2003 | Ouye | | 2005/0177858 A1 | 8/2005 | Ueda |
| 2003/0120684 A1 | 6/2003 | Zuili et al. | | 2005/0198326 A1 | 9/2005 | Schlimmer et al. |
| 2003/0126434 A1 | 7/2003 | Lim et al. | | 2005/0223242 A1 | 10/2005 | Nath |
| 2003/0132949 A1 | 7/2003 | Fallon et al. | | 2005/0223414 A1 | 10/2005 | Kenrich et al. |
| 2003/0154296 A1 | 8/2003 | Noguchi et al. | | 2005/0235154 A1 | 10/2005 | Serret-Avila |
| 2003/0154381 A1 | 8/2003 | Ouye | | 2005/0256909 A1 | 11/2005 | Aboulhosn et al. |
| 2003/0154396 A1 | 8/2003 | Godwin et al. | | 2005/0268033 A1 | 12/2005 | Ogasawara et al. |
| 2003/0154401 A1 | 8/2003 | Hartman et al. | | 2005/0273600 A1 | 12/2005 | Seeman |
| 2003/0159048 A1 | 8/2003 | Matsumoto et al. | | 2005/0283610 A1 | 12/2005 | Serret-Avila et al. |
| 2003/0159066 A1 | 8/2003 | Staw et al. | | 2005/0288961 A1 | 12/2005 | Tabrizi |
| 2003/0163704 A1 | 8/2003 | Dick et al. | | 2006/0005021 A1 | 1/2006 | Torrubia-Saez |
| 2003/0165117 A1 | 9/2003 | Garcia-Luna-Aceves et al. | | 2006/0075258 A1 | 4/2006 | Adamson et al. |
| 2003/0172280 A1 | 9/2003 | Scheidt et al. | | 2006/0075465 A1 | 4/2006 | Ramanathan et al. |
| 2003/0177070 A1 | 9/2003 | Viswanath et al. | | 2006/0093150 A1 | 5/2006 | Reddy et al. |
| 2003/0177378 A1 | 9/2003 | Wittkotter | | 2006/0101285 A1 | 5/2006 | Chen et al. |
| 2003/0182310 A1 | 9/2003 | Charnock et al. | | 2006/0149407 A1 | 7/2006 | Markham et al. |
| 2003/0182579 A1 | 9/2003 | Leporini et al. | | 2006/0168147 A1 | 7/2006 | Inoue et al. |
| 2003/0182584 A1 | 9/2003 | Banes et al. | | 2006/0184637 A1 | 8/2006 | Hultgren et al. |

| 2006/0230437 | A1 | 10/2006 | Boyer et al. |
| 2006/0277316 | A1 | 12/2006 | Wang et al. |
| 2007/0006214 | A1 | 1/2007 | Dubal et al. |
| 2007/0067837 | A1 | 3/2007 | Schuster |
| 2007/0083575 | A1 | 4/2007 | Leung et al. |
| 2007/0192478 | A1 | 8/2007 | Louie et al. |
| 2007/0294368 | A1 | 12/2007 | Bomgaars et al. |
| 2009/0254843 | A1 | 10/2009 | Van Wie et al. |
| 2010/0047757 | A1 | 2/2010 | McCurry et al. |
| 2010/0199088 | A1 | 8/2010 | Nath |

FOREIGN PATENT DOCUMENTS

| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| JP | 2006-244044 | 9/2006 |
| JP | 2009-020720 A | 1/2009 |
| WO | WO 96/41288 A1 | 12/1996 |
| WO | WO 00/56028 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Symantec. Norton Antivirus Coporate Edition Implementation Guide, 1999.
Stallings, William, "Cryptography and Network Security: Principles and Practice," 199, pp. 333-337, Second Edition, Prentice Hall, Upper Saddle River, New Jersey.
U.S. Appl. No. 10/076,254, Alan Rossmann, Method and Architecture for Providing Pervasive Security to Digtal Assets, filed Feb. 12, 2002.
U.S. Appl. No. 10/074,804, Denis Jacques Paul Garcia, Secured Data Format for Access Control, filed Feb. 12, 2002.
U.S. Appl. No. 10/127,109, Michael Michio, Dynamic Evaluation of Access Rights, filed Apr. 22, 2002.
U.S. Appl. No. 10/159,537, Denis Jacques Paul Garcia, Method and Apparatus for Securing Digital Assets, filed May 31, 2002.
"Inside Encrypting File System," Part 1, from MSDN Oct. 2001 version, exact publication date is unknown but believed to be prior to Dec. 12, 2001.
"Inside Encrypting File System," Part 2, from MSDN Oct. 2001 version, exact publication date is unknown but believed to be prior to Dec. 12, 2001.
"Security with Encrypting File System," from MSDN Oct. 2001 version, exact publication date is unknown but believed to be prior to Dec. 12, 2001.
"How EFS Works," from MSDN Oct. 2001 version, exact publication date is unknown but believed to be prior to Dec. 12, 2001.
"Encrypting File System," from MSDN Oct. 2001 version, exact publication date is unknown but believed to be prior to Dec. 12, 2001.
"Features of EFS," from MSDN Oct. 2001 version, exact publication date is unknown but believed to be prior to Dec. 12, 2001.
"Windows 2000 EFS," in the Apr. 1999 issue of Windows NT Magazine.
"Expiration Mechanism for Chipcards," IBM Technical Disclosure Bulletin, Oct. 1, 2001, UK.
McDaniel et al., "Antigone: A Flexible Framework for Secure Group Communication," Proceedings of the 8th USENIX Security Symposium, Aug. 23, 1999.
Crocker, Steven Toye, "Multi-level cryptographic transformations for securing digital assets, "U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment, "U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities" inventor Vainstein, Dec. 20, 2002, 39 pgs.
U.S. Appl. No. 10/286,524, entitled "Security system that uses indirect password-based encryption," inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. Appl. No. 10/642,041, entitled "Method and system for fault-tolerant transfer of files across a network" inventor Kenrich, Aug. 15, 2003, 32 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for identifying compounds that inhibit or reduce PTP1B expressions" inventor Rondinone, Feb. 12, 2002, 69 pgs.
U.S. Appl. No. 10/074,804, entitled "Secured Data Format for Access Control,"inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 111 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.
U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Office Action, dated May 10, 2005, for European Patent Application No. 02258532.7, 5 pgs.

Office Action, dated Dec. 5, 2006, for European Patent Application No. 02258532.7, 5 pgs.

Boneh et al., "Hierarchical Identity Based Encryption with Constant Size Ciphertext," Advances in Cryptology- Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

"Column Archives," Microsoft TechNet, Professor Windows, technet.microsoft.com/enus/library/bb878075.aspx, retrieved on Dec. 3, 2009.

"Columns," Microsoft TechNet http://web.archive.org/web/20021014225142/www. microsoft.com/techneUcolumns/default.asp Oct. 14, 2002, Retrieved from web.archive.org on Dec. 3, 2009.

"eXPeriencing Remote Assistance" Microsoft TechNet—Professor Windows Oct. 2002 Oct. 15, 2002 http://web.archive.org/web/20021015165237/www.microsoft.com/techneUcolumns/profwin/, Retrieved from web.archive.org on Dec. 3, 2009.

Juvva et al. "A Real-Time Push-Pull Communications Model for Distributed Real-Time and Multimedia Systems," Jan. 1999, School of Computer Sciences Carnegie Mellon University.

"Migrating Accounts From Windows NT 4.0 Domains to Windows 2000," Microsoft TechNet—Professor Windows Apr. 2002, http://web.archive.org/web/20020415004611/www. microsoft.com/technetlcolu mns/profwin/, Apr. 15, 2002.

"Scripting Your Windows 2000 Network, Part 1" Microsoft TechNet—Professor Windows Jun. 2002, http://web.archive.org/web/20020622055532/www.microsoft.com/techneUcolumns/profwin/, retrieved from, web.archive.org on Dec. 3, 2009.

"WayBack Machine" web.archive.org, http://web.archive.org/web/*/http://www.microsoft.com/technetlcolumns/profwin/, Retrieved on Dec. 3, 2009.

English language translation (unverified, machine-generated) of Japanese Patent Publication No. JP 2006-244044, Japanese Patent Office, Patent & Utility Model Gazette DB, 2006.

English language translation (unverified, machine-generated) of Japanese Patent Publication No. 2009-020720, Japanese Patent Office, Patent & Utility Model Gazette DB, 2009.

Curtis et al., "Securing the Global, Remote, Mobile User," 1999 John Wiley & Sons, Ltd., Int. J. Network Mgmt. 9, pp. 9-21.

"Secure Sockets Layer (SSL): How it Works," Verisign, http://www.verisign.com/ssl/ssl-information-center/how-ssl-security-works, pp. 1-2.

Office Action, dated Oct. 5, 2005, for European Patent Application No. 02258532.7, 5 pgs.

English language abstract for Japanese Appl. No. 2001-036517, filed Feb. 9, 2001, 1 pg.

Botha et al., "Access Control in Document-Centric Workflow Systems—An Agent-Based Approach," Computers & Security, vol. 20:6, Sep. 2001, pp. 525-532.

Botha et al., "Separation of Duties for Access Control Enforcement in Workflow Environments," IBM, 2001.

* cited by examiner

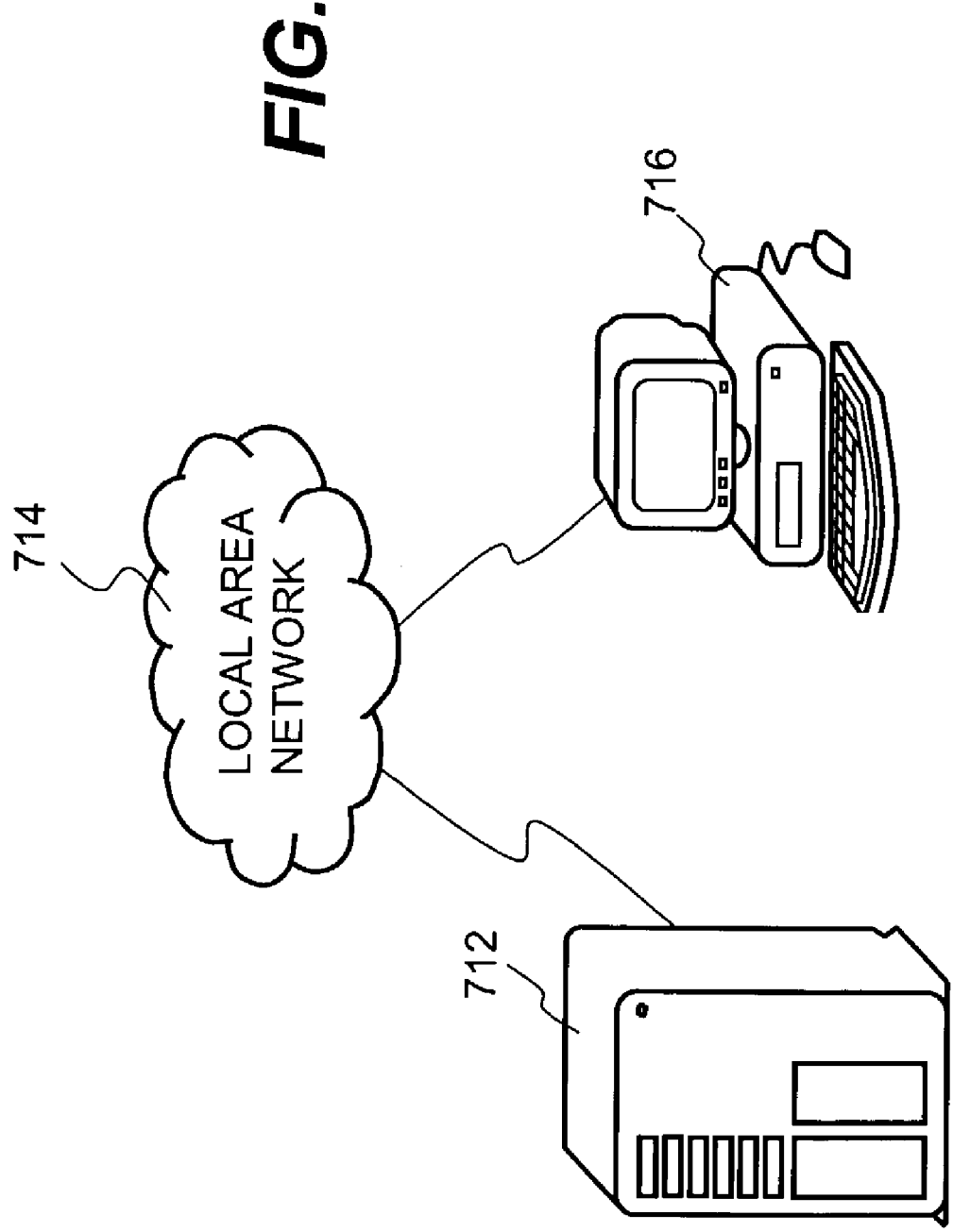

MULTI-LEVEL CRYPTOGRAPHIC TRANSFORMATIONS FOR SECURING DIGITAL ASSETS

CROSS-REFERENCE TO RELATED APPLICATIONS

This application is a continuation-in-part of U.S. patent application Ser. No. 10/074,804, filed Feb. 12, 2002 now U.S. Pat. No. 7,380,120, and entitled "SECURED DATA FORMAT FOR ACCESS CONTROL," which is hereby incorporated herein by reference, and which claims the benefit of U.S. Provisional Application No. 60/339,634, filed Dec. 12, 2001, and entitled "PERVASIVE SECURITY SYSTEMS," which is hereby incorporated herein by reference. This application is also related to U.S. patent application Ser. No. 10/159,537, filed May 5, 2002 (now U.S. Pat. No. 7,178,033), and entitled "METHOD AND APPARATUS FOR SECURING DIGITAL ASSETS," which is hereby incorporated herein by reference. This application is also related to U.S. patent application Ser. No. 10/127,109, filed Apr. 22, 2002, and entitled "EVALUATION OF ACCESS RIGHTS TO SECURED DIGITAL ASSETS", which is hereby incorporated herein by reference.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept information traveling across the Internet and even gain access to proprietary information stored in computers that interconnect to the Internet.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has led to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Consequently, various cryptographic means are deployed to provide restricted access to electronic data in security systems.

Various security criteria, such as encryption or decryption keys, are often used to facilitate restricted access to data in security systems. Conventionally, security criteria (e.g., keys) are assigned in accordance with fixed cryptographic operations that are used to similarly secure all electronic resources (e.g., data). However, the assigning of security criteria in this way does not permit flexible imposition and management of security for security systems that secure electronic resources for many users and for many different types of resources. Therefore, there is a need to provide more effective ways to utilize security criteria (e.g., keys) for security systems to secure and protect electronic resources.

SUMMARY OF THE INVENTION

The invention pertains to multi-level cryptographic transformations performed to secure electronic files. The secured electronic files contain not only secured data but also security information. The security information includes cryptographic structure information, access rules and secrets (e.g., keys). The cryptographic structure information explains the multi-level cryptographic transformations associated with securing or unsecuring the electronic files. The access rules and the secrets are used by the cryptographic transformations to secure the electronic files. Since the secured electronic files contain the cryptographic structure information, the particular cryptographic transformations (including their sequencing) can vary with each electronic file, if so desired. Typically, the secured electronic files are secured and managed by a file security system, such as a distributed security system.

The invention can be implemented in numerous ways, including as a method, system, device, and computer readable medium. Several embodiments of the invention are discussed below.

As a secure electronic file that is secured through a multi-stage encryption process, one embodiment of the invention includes at least secure data and a header portion. The secure data is secured by encryption. The header portion includes at least security information. The security information includes at least encryption structure information, access rules, and secrets. The encryption structure information interrelates the access rules and the secrets to describe the multi-stage encryption process or decryption thereof.

As a method for accessing a secure electronic file having a header and secure data, one embodiment of the invention includes at least the acts of: receiving a request from a requestor to access the secure electronic file; obtaining security information from the header of the secure electronic file, the security information including at least encryption structure information, access rules and secrets; and attempting to decrypt at least the secure data of the secure electronic file for access by the requestor based on the encryption structure information, the access rules and the secrets. When the attempting is able to successfully decrypt at least the secure data of the secure electronic file, the requestor gains access to the secure data which has been unsecured for access by the requestor.

As a method for accessing a secure electronic file, one embodiment of the invention includes at least the acts of: receiving a file access request from a requestor; determining whether the requestor has sufficient security clearance to access the secure electronic file, the secure electronic file having a security clearance level; obtaining a security clearance private key for the requestor when it is determined that the requestor has sufficient security clearance to access the secure electronic file; decrypting an encrypted security clearance key using the security clearance private key to obtain the security clearance key; determining whether the requestor is permitted to access the secure electronic file based on the content type; obtaining a content type private key for the requestor when it is determined that the requestor is permitted to access the secure electronic file based on the content type; decrypting an encrypted content type key using the content type private key to obtain the content type key; determining whether the requestor is a member of a group authorized to access the secure electronic file; obtaining a private group key for the requestor when it is determined that the requestor is a member of a group authorized to access the secure electronic file; decrypting an encrypted group key using the private group key to obtain the group key; decrypting a file key using the security clearance key, the content type key and the group key to obtain a file key; and unsecuring at least a data portion of the secured electronic file using the file key.

As a method for accessing a secure electronic file, one embodiment of the invention includes at least the acts of: receiving a file access request from a requestor; determining whether the requestor is a member of a group authorized to access the secure electronic file; obtaining a private group key for the requestor when it is determined that the requestor is a member of a group authorized to access the secure electronic file; decrypting an encrypted group key block using the private group key to obtain a first key; decrypting an encrypted content type key block using the first key to obtain the content type key block; determining from the content type key block whether the requestor is permitted to access the secure electronic file based on the content type; obtaining a content type private key for the requestor when it is determined that the requestor is permitted to access the secure electronic file based on the content type; decrypting an encrypted content type sub-key block using the content type private key to obtain a second key; decrypting an encrypted security clearance key block using the second key to obtain the security clearance key block; determining from the security clearance key block whether the requestor has sufficient security clearance to access the secure electronic file; obtaining a security clearance private key for the requestor when it is determined that the requestor has sufficient security clearance to access the secure electronic file; decrypting an encrypted security clearance sub-key block using the security clearance private key to obtain a third key; and unsecuring at least a data portion of the secured electronic file using the third key.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings wherein:

FIGS. 7A-7C show system configurations in which the present invention may be practiced in accordance with embodiments thereof.

DETAILED DESCRIPTION OF THE INVENTION

Figure 1A:
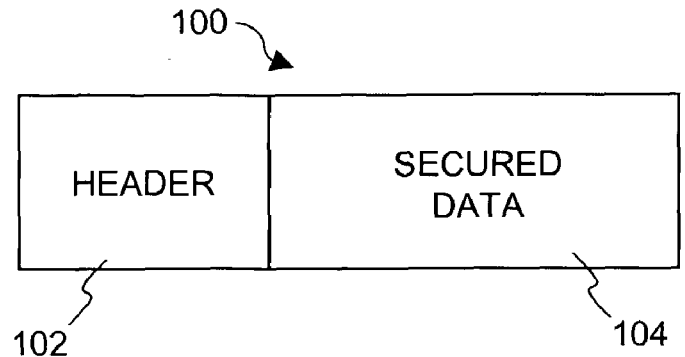
FIG. 1A is a block diagram of a secure file according to one embodiment of the invention.

The invention pertains to multi-level cryptographic transformations performed to secure electronic files. The secured electronic files contain not only secured data but also security information. The security information includes cryptographic structure information, access rules and secrets (e.g., keys). The cryptographic structure information explains the multi-level cryptographic transformations associated with securing or unsecuring the electronic files. The access rules and the secrets are used by the cryptographic transformations to secure the electronic files. Since the secured electronic files contain the cryptographic structure information, the particular cryptographic transformations (including their sequencing) can vary with each electronic file, if so desired. Typically, the secured electronic files are secured and managed by a file security system, such as a distributed security system.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges. Each secured file is provided with a header portion and a data portion, where the header portion contains, or points to, security information. The security information is used to determine whether access to associated data portions of secured files is permitted.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being. The distribution of such changes to security policies can be deferred for those affected users who are not activated (e.g., logged-in or on-line) with the security system.

The present invention is related to processes, systems, architectures and software products for providing pervasive security to digital assets (e.g., electronic documents). The present invention is particularly suitable in an enterprise environment. In general, pervasive security means that digital assets are secured (i.e., secured items) and can only be accessed by authenticated users with appropriate access rights or privileges. Digital assets may include, but not be limited to, various types of documents, multimedia files, data, executable code, images and texts.

In the following description, numerous specific details are set forth in order to provide a thorough understanding of the present invention. However, it will become obvious to those skilled in the art that the present invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the invention are discussed herein with reference to FIGS. 1A-7C. However, those skilled in the art will readily appreciate that the detailed description given herein with respect to these figures is for explanatory purposes as the invention extends beyond these limited embodiments.

Cryptography refers to scrambling plaintext (ordinary text, sometimes referred to as "cleartext") into "ciphertext" (a process called encryption), then back again (known as decryption). According to the invention, an electronic file (or document) contains data and cryptographic transformations are imposed to secure the electronic file. To gain access to the data of the secured electronic file, the cryptographic transformation must be undone. The cryptographic information provided with the electronic file is used in determining how to unsecure the secured electronic file.

FIG. 1A is a block diagram of a secure file 100 according to one embodiment of the invention. The secure file includes a header 102 and secured data 104. The header 102 stores a secret (e.g., a key) that is secured by some means and describes cryptographic transformations needed to access the secret. Typically, to access the secret, a set of cryptographic transformations must be performed in series or parallel. Hence, to access the secret, one must successfully access sub-secrets of a plurality of cryptographic transformations that lead to the secret. In other words, to obtain the secret, one must be able to decrypt a sequence or hierarchy of sub-secrets. The sub-secrets can be divided into two groups. A first group of sub-secrets correspond to local secrets, which can be keys encrypted locally by other secrets. The second group of sub-secrets correspond to external secrets, which can generally be provided by a document securing system. For example, the external secrets can be group keys.

Figure 1B:
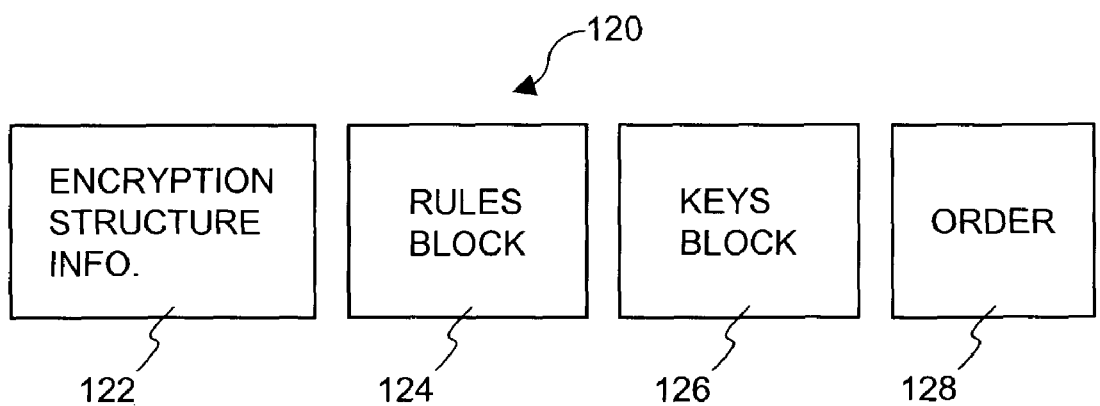
FIG. 1B is a block diagram of a header according to one embodiment of the invention.

FIG. 1B is a block diagram of a header 120 according to one embodiment of the invention. The header 120, for example, pertains to the header 102 illustrated in FIG. 1A. The header 120 includes encryption structure information 122, rules block 124, keys block 126 and other 128. The encryption structure information 122 provides information on how a set of cryptographic transformations are performed in securing the secret (e.g., file key) that is used to unsecure the secured data 104. The encryption structure information 122 is also more generally referred to as cryptographic structure information. These cryptographic transformations can be performed in series or in parallel. The rules block 124 includes a plurality of rules which can be used in determining whether access is permitted to the secured data 104. For example, the rules block can include rules (i.e., access rules) that limit the availability of keys to those users that satisfy membership within groups. The keys block 126 contains keys that are utilized with respect to the cryptographic transformations. The keys can be within separate blocks that are themselves encrypted. The other 128 is additional space within the header 120 where any other additional information could be stored.

Figure 1C:
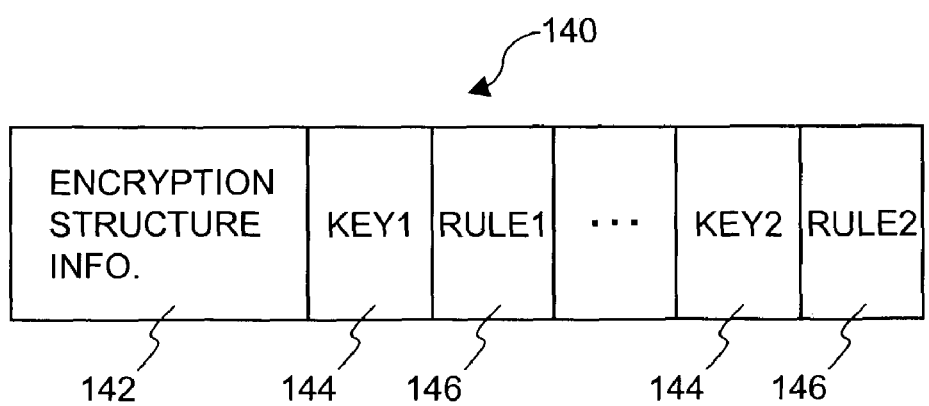
FIG. 1C is a block diagram of a header according to another embodiment of the invention.

FIG. 1C is a block diagram of a header 140 according to another embodiment of the invention. The header 140 includes encryption structure information 142, keys 144 and rules 146. To gain access to key 1, the user would need to satisfy rule 1, and to gain access to key 2, the user would have to satisfy rule 2. Further, the key 2 can be utilized to decrypt the rule 1, which itself can be encrypted, and key 1 can be used to decrypt the secured data of the secured file.

Figure 2:
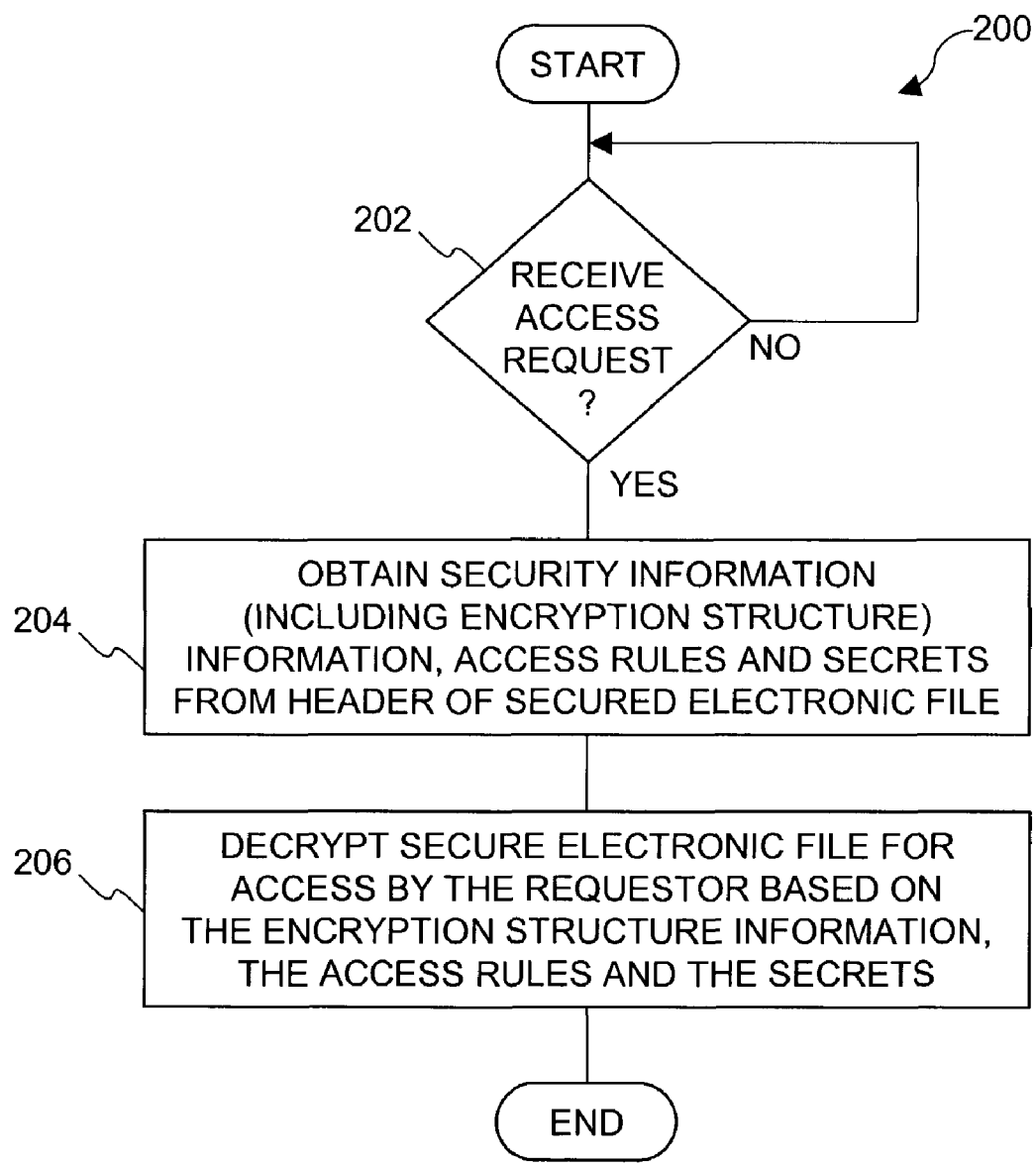
FIG. 2 is a flow diagram of secure file access processing according to one embodiment of the invention.

FIG. 2 is a flow diagram of secure file access processing 200 according to one embodiment of the invention. The secure file access processing 200 is processing performed by a file security system when a requestor (user) desires to gain access to a secure electronic file.

The secure file access processing 200 begins with a decision 202 that determines whether an access request has been received. Here, the access request would be received from a requestor (user) of the file security system. When the decision 202 determines that an access request has not yet been received, the secure file access processing 200 awaits such a request. On the other hand, once the decision 202 determines that an access request has been received, the secured file access processing 200 continues. In other words, the secure file access processing 200 can be deemed invoked once an access request is received.

In any case, after the access request has been received, security information is obtained 204 from a header of the secured electronic file. The security information includes at least encryption structure information, access rules and secrets. The encryption structure information provides information on how the cryptographic transformations were performed to encrypt or how the cryptographic transformations are to be performed to decrypt the secured data of the secure electronic file. The cryptographic transformations make use of the access rules and the secrets that are linked to or provided within the security information.

After the security information has been obtained 204, the secure electronic file can be decrypted 206 for access by the requestor. The decryption 206 of the secure electronic file is performed based on the encryption structure information, the access rules and the secrets. Typically, the cryptographic transformations that need to be performed in order to decrypt the secure electronic file have a hierarchy or order to be followed. Further, these cryptographic transformations make use of the active rules and the secrets in order to decrypt the secure electronic file. After the secure electronic file is decrypted 206, the requestor (user) is able to access and thus make use of the data (that was previously secured) of the electronic file. Following the decryption 206, the secure file access processing 200 is complete and ends.

According to one aspect of the invention, cryptographic transformations used to encrypt/decrypt an electronic file can be defined/described by a cryptographic structure. The cryptographic structure describes the sequence and cryptographic transformations being performed in securing an electronic file (e.g., electronic document). Thus, the cryptographic structure can vary with the specifics of the sequence and cryptographic transformations being performed, which can vary widely with application.

Figure 3A:
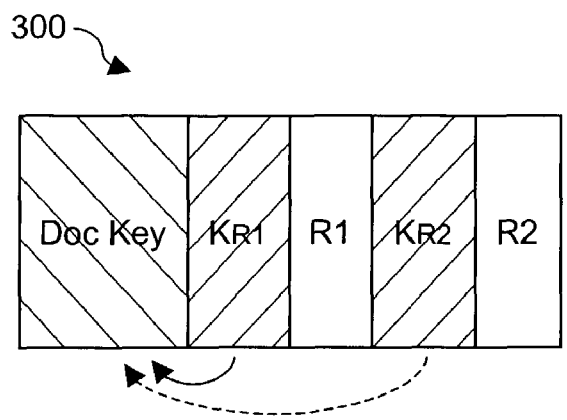
FIG. 3A illustrates an encryption structure according to one embodiment of the invention.
Figure 3B:
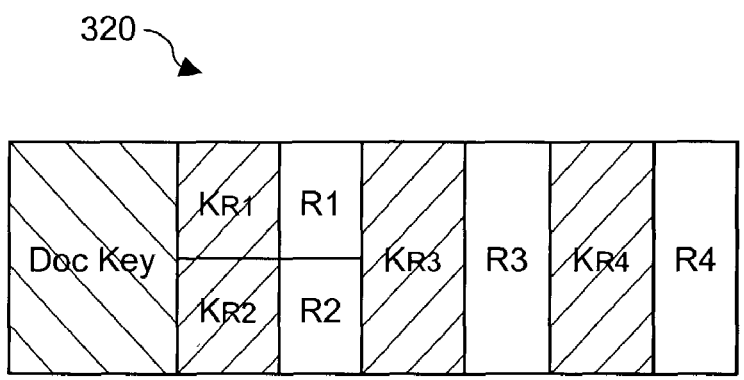
FIG. 3B illustrates an encryption structure according to another embodiment of the invention.
Figure 3C:
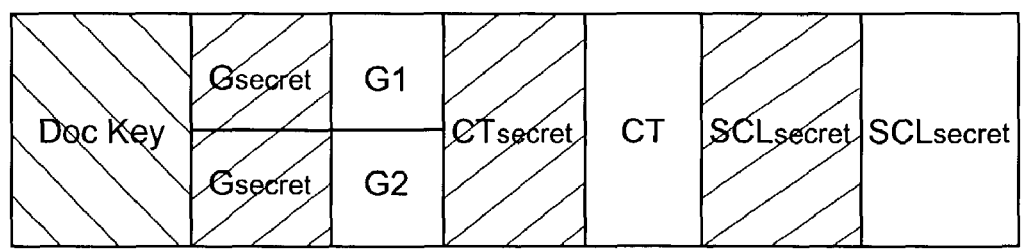
FIG. 3C is a diagram of an encryption structure according to another embodiment of the invention.

FIGS. 3A-3C are embodiments of encryption structures that can be implemented by the header 102 illustrated in FIG. 1A, the header 120 illustrated in FIG. 1B, or the header 140 illustrated in FIG. 1C.

FIG. 3A illustrates an encryption structure 300 according to one embodiment of the invention. The encryption structure 300 permits access to a DocKey (DK), which refers to a document key which is a secret that is used to encrypt the data of an electronic file which becomes the secured data (e.g., secured data 104). According to the encryption structure 300, the DocKey is encrypted by key $K_{R1}$ which is in turn permitted to be acquired only by users satisfying rule R1. Access to the key $K_{R1}$ can be limited by encrypting the key $K_{R1}$ and allowing only those users that satisfy rule R1 to decrypt the key $K_{R1}$. The DocKey, after being encrypted by the key $K_{R1}$, is again encrypted by key $K_{R2}$. The key $K_{R2}$ is itself encrypted so as to be accessed only by users that satisfy rule R2. In other words, for a user to gain access to the DocKey that is used to decrypt the secured data, the user must be able to satisfy both the rules R1 and R2. This encryption structure 300 thus can be represented by the notation as follows:

(R1)Λ(R2)→DocKey.

It should be noted that the symbol "Λ" represents a logical "AND" operation. As explained, the DocKey is twice encrypted and both the keys $K_{R1}$ and $K_{R2}$ are needed to access the DocKey. Alternatively, for example, the DocKey can be once encrypted by the key $K_{R1}$ and the rule R1 can be encrypted by key $K_{R2}$.

FIG. 3B illustrates an encryption structure 320 according to another embodiment of the invention. The encryption structure 320 uses additional protections to secure the DocKey than does the encryption structure 300 illustrated in FIG. 3A. In this example, the user seeking to access a secure document (secured in accordance with the encryption structure 320) must be able to satisfy rule R4, rule R3 and either rule R1 or rule R2.

For example, if the user satisfies rule R4, the user can be given a key to decrypt the encrypted block containing key $K_{R4}$. Similarly, if the user is able to satisfy rule R3, the user is given a key to decrypt the encrypted block containing key $K_{R3}$. Further, if the user can satisfy rule R1, the user is able to decrypt the encrypted key block containing key $K_{R1}$, or if the user is able to satisfy the rule R2, the user is able to decrypt the encrypted key block containing key $K_{R2}$. In this example, the DocKey is triple encrypted such that to obtain the DocKey in its decrypted format, the DocKey must first be decrypted using key $K_{R4}$, and then key $K_{R3}$, and then either key $K_{R1}$ or key $K_{R2}$. In other words, for the user to gain access to the DocKey that is used to decrypt the secured data of the secure electronic file, the user must satisfy rule R1 or rule R2 as well as both rule R3 and rule R4. This encryption structure 320 thus can be represented by the notation as follows:

((R1)V(R2))Λ(R3)Λ(R4)→DocKey

It should be noted that the symbol "V" represents a logical "OR" operation. As explained, the DocKey is triple encrypted and the keys $K_{R4}$, $K_{R3}$ and either key $K_{R1}$ or $K_{R2}$ are needed to access the DocKey. The keys $K_{R1}$ and $K_{R2}$ can also be the same, although different while separately encrypted. Alternatively, for example, the DocKey can be once encrypted by the key $K_{R1/R2}$ and the rules R1 and R2 can be encrypted by key $K_{R3}$, and the rule R3 can be encrypted by key $K_{R4}$.

FIG. 3C is a diagram of an encryption structure 340 according to another embodiment of the invention. The encryption structure 340 depicts one implementation that secures a DocKey through use of other keys protected by rules, content types and security clearance levels. The DocKey can be triple-encrypted by a group secret ($G_{secret}$), a content type secret ($CT_{secret}$), and a security clearance level ($SCL_{secret}$). Each of these secrets (keys) can themselves be encrypted and protected by the rules, content type or security clearance level. For example, a user must have top security clearance in order to decrypt the encrypted security clearance level secret ($SCL_{secret}$). The user must be permitted to access the content type of the secure electronic file in order to decrypt the encrypted content type secret ($CT_{secret}$). Also, the user must be a member of either group 1 (G1) or group 2 (G2) in order to decrypt the encrypted group secret ($G_{secret}$). This encryption structure 340 thus can be represented by the notation as follows:

DocKey←$SCL_{secret}$, $CT_{secret}$, $G_{secret}$
$SCL_{secret}$←$SCL_{TOP}$
$CT_{secret}$←CT
$G_{secret}$←G1
$G_{secret}$←G2

Figure 4A:
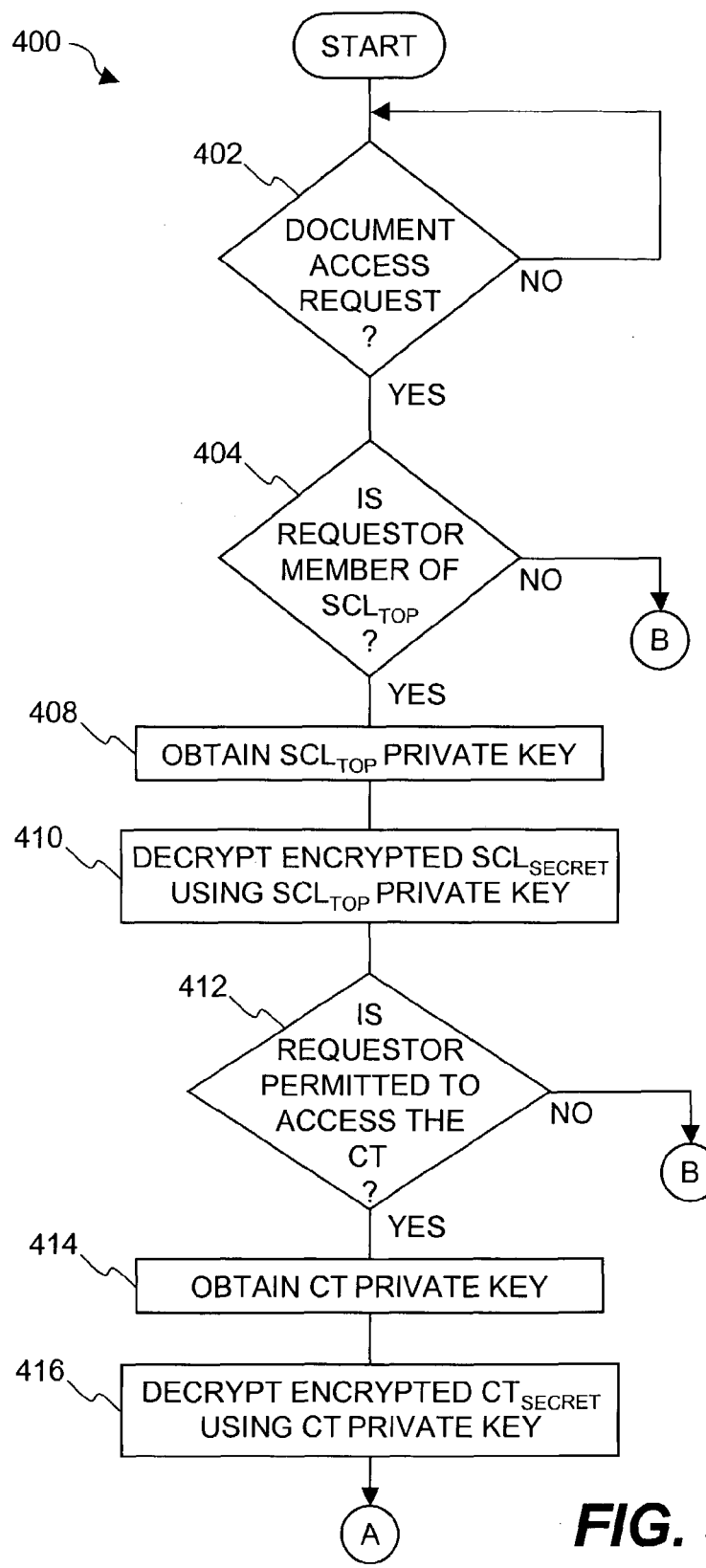
FIGS. 4A and 4B are flow diagrams of secure file access processing according to another embodiment of the invention.
Figure 4B:
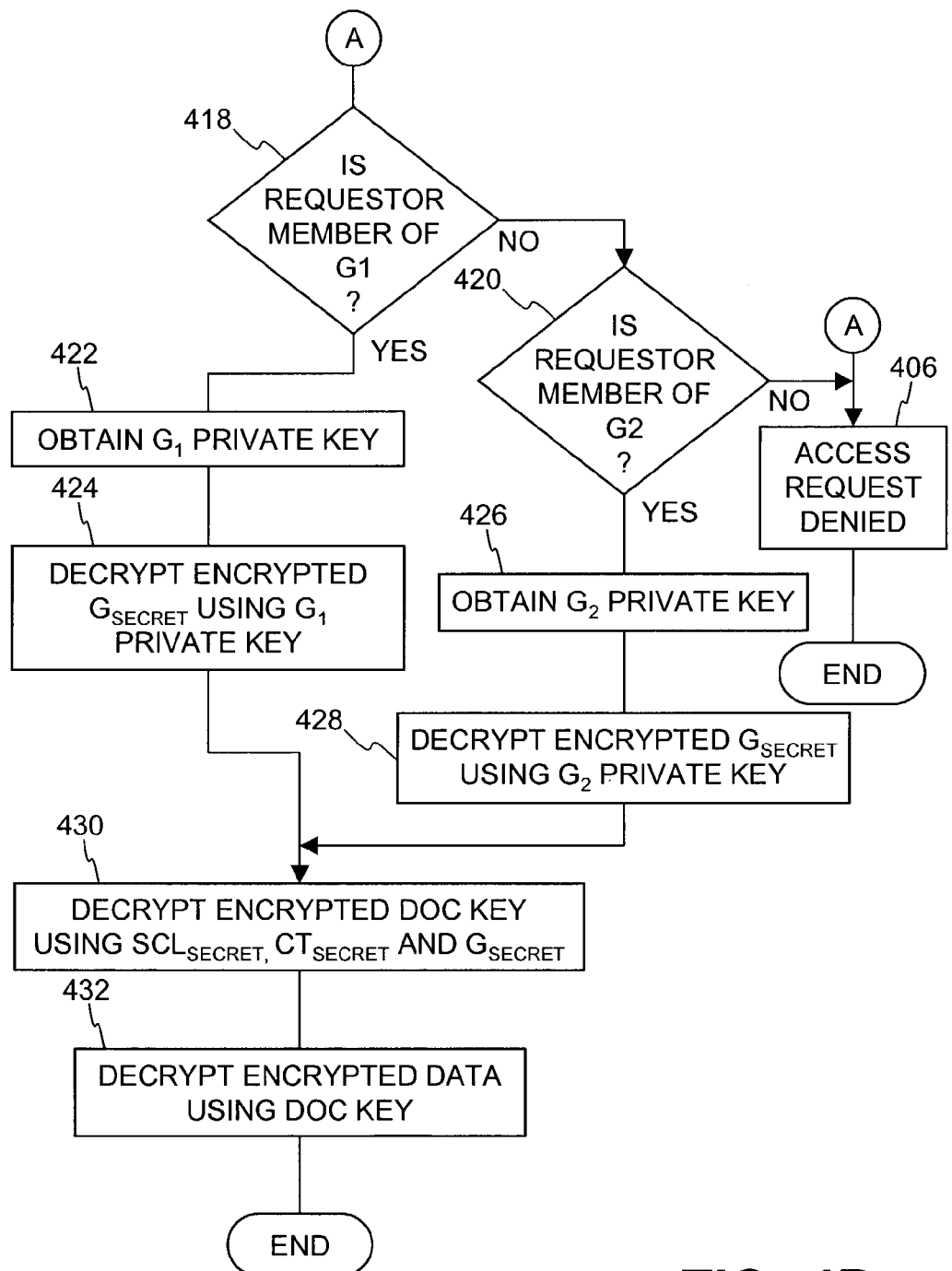

FIGS. 4A and 4B are flow diagrams of secure file access processing 400 according to one embodiment of the invention. The secure file access processing 400 represents processing performed in order to obtain access to an electronic file that is secured by multiple layers of encryption, such as indicated by the encryption structure 340 shown in FIG. 3C. In other words, the secret (e.g., DocKey) that is utilized to decrypt the secured data of the electronic file is triple encrypted with keys pertaining to group membership, content type and security clearance level.

The secure file access processing 400 begins with a decision 402 that determines whether a document access request has been received. When the decision 402 determines that a document access request has not yet been received, the secure file access processing 400 awaits such a request. Once the decision 402 determines that a document access request has been received, then a decision 404 determines whether the requestor is a member of top security clearance level ($SCL_{TOP}$). In other words, whether the requestor is permitted to access electronic documents classified as top secret. When the decision 404 determines that the requestor is not a member of the top secret security clearance level, then the request to access the secure electronic document is denied 406.

On the other hand, when the decision 404 determines that the requestor is entitled to access top secret security clearance level documents, then a top secret security clearance level ($SCL_{TOP}$) private key is obtained 408. Next, an encrypted security clearance level secret ($SCL_{secret}$) is decrypted 410 using the top secret security clearance level ($SCL_{TOP}$) private key.

A decision 412 then determines whether the requestor is permitted to access the content type associated with the secure electronic document (file) being requested. When the decision 412 determines that the requestor is not permitted to access the content type of the secure document, then the request to access the secure electronic document is denied 406. Alternatively, when the decision 412 determines that the requestor is permitted to access the content type associated with the secure electronic document, then a content type (CT) private key is obtained 414. The content type (CT) private key is then used to decrypt 416 an encrypted content type key ($CT_{secret}$).

Thereafter, a decision 418 determines whether the requestor is a member of group 1 (G1). When the requestor is not a member of group 1 (G1), a decision 420 determines whether the requestor is a member of group 2 (G2). When the requestor is not a member of either group 1 (G1) or group 2 (G2), then the request to access the secure electronic document is denied 406. When the decision 418 determines that the requestor is a member of group 1 (G1), then the group 1 (G1) private key is obtained 422. Then, using the group 1 (G1) private key, an encrypted group secret ($G_{secret}$) is decrypted 424. Alternatively, when the requestor is a member of group 2 (G2) (and not a member of group 1 (G1)), a group 2 (G2) private key is obtained 426. Then, using the group 2 (G2) private key, the encrypted group secret ($G_{secret}$) is decrypted 428.

Following operations 424 or 428, an encrypted DocKey is decrypted 430 using the security clearance level secret ($SCL_{secret}$), the content type secret ($CT_{secret}$) and the group secret ($G_{secret}$). Then, after the encrypted DocKey is decrypted 430, the encrypted data of the secure electronic document is decrypted 432 using the DocKey, thereby allowing the requestor to access the data associated with the electronic file. Following the operation 432, the secure file access processing 400 is complete and ends with the user having gained access to the data of the secure electronic document. On the other hand, following the operation 406, the secure file access processing 400 is complete and ends with the requestor having been denied access to the data of the secure electronic document.

According to another aspect of the invention, cryptographic transformations used to encrypt/decrypt an electronic file can be represented as a cryptographic structure graph (as referred to as an encryption structure graph). The cryptographic structure graph illustrates the sequence and cryptographic transformations being performed in securing an electronic file (e.g., electronic document). Thus, the cryptographic structure graphs can vary with the specifics of the sequence and cryptographic transformations being performed, which can vary widely with application. Further, different access requirements (e.g., through different sequence and cryptographic transformations) can be achieved by changing or altering the cryptographic structure graph transformations FIGS. 5A-5D are exemplary embodiments of cryptographic structure graphs that can be implemented by the header 102 illustrated in FIG. 1A, the header 120 illustrated in FIG. 1B, or the header 140 illustrated in FIG. 1C.

Figure 5A:
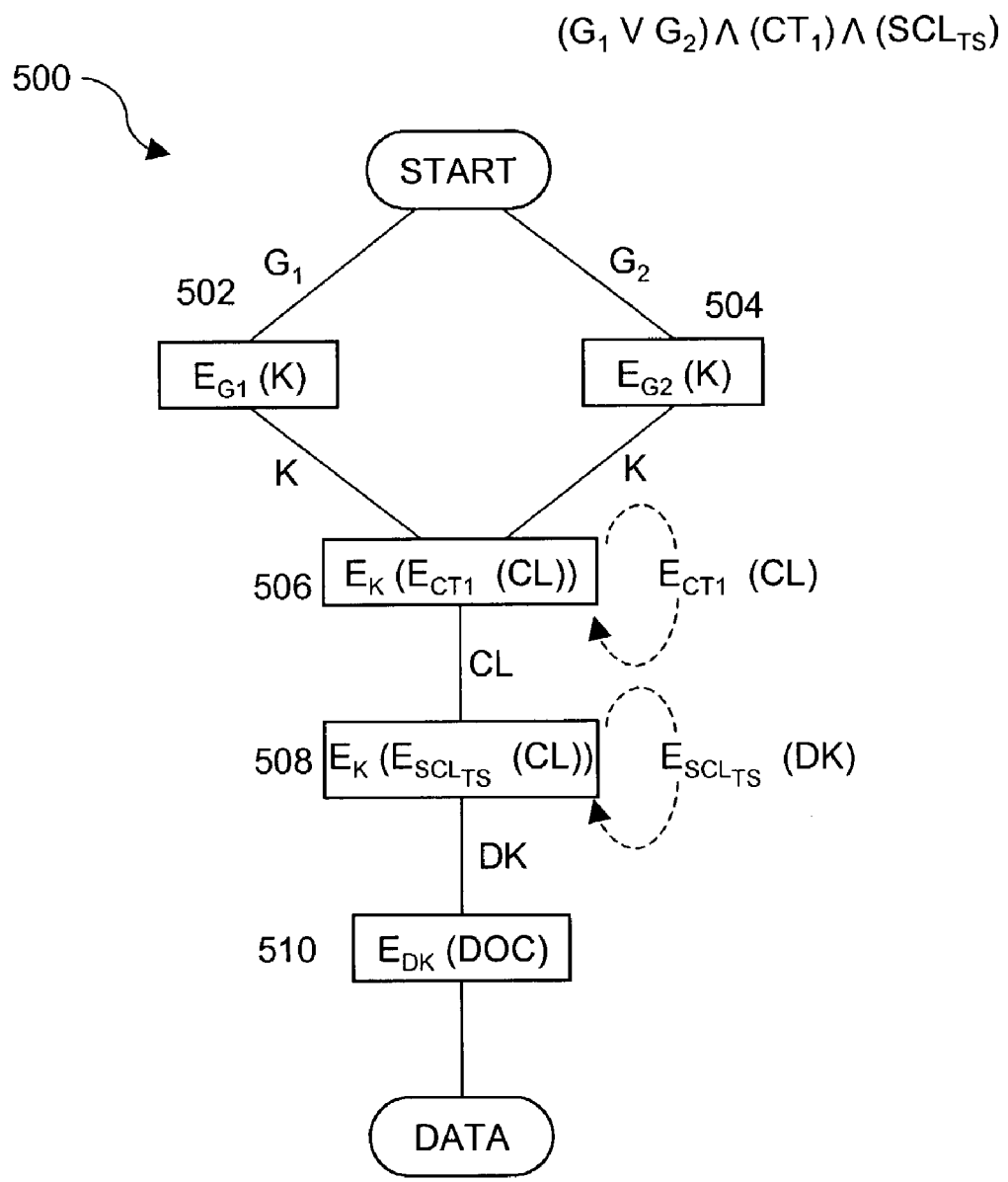
FIG. 5A is a cryptographic structure graph according to one embodiment of the invention.

FIG. 5A is a cryptographic structure graph 500 according to one embodiment of the invention. According to the cryptographic structure graph 500, a requestor must be a member of group 1 (G1) or group 2 (G2), as well as be permitted to access documents having a first content type (CT1) and a top secret security clearance level ($SCL_{TS}$). This encryption structure graph 500 thus can be represented by the notation as follows:

(G1 V G2)Λ(CT1)Λ($SCL_{TS}$)→DocKey

Figures 5B, 5C:
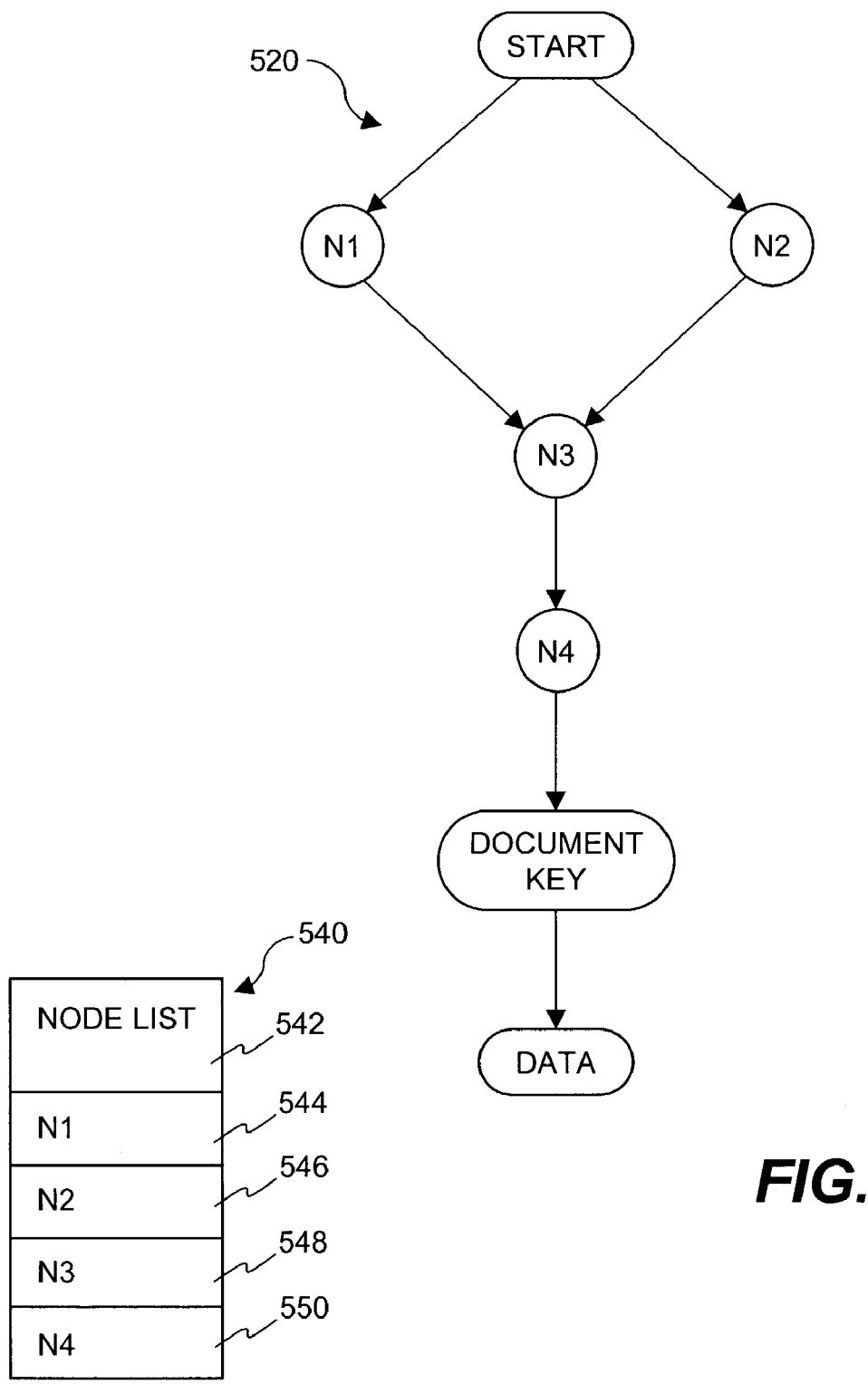
FIG. 5B is a cryptographic structure graph according to another embodiment of the invention.
FIG. 5C is a representative header that can be part of a secure electronic file (document) according to one embodiment of the invention.

The DocKey is thus protected by three levels of cryptographic transformations. More particularly, if the requestor is a member of group 1 (G1) or group 2 (G2), then a private key is obtained and used to decrypt a block or node 502 or 504 containing a key (K). The key (K) is used to decrypt a next block or node 506. At the node or block 506, if the requestor is permitted to access documents of a first content type (CT1), then a private key is obtained and used to decrypt the sub-block or node containing a clearance level (CL) key. The clearance level (CL) key is used to decrypt a next block or node 508. At the node 508, if the requestor is permitted to access documents requiring a top secret security clearance level ($SCL_{TS}$), then a private key is obtained and used to decrypt the sub-block or node containing a DocKey (DK). Once the requestor acquires the DocKey, the secured data of the electronic document can be decrypted using the DocKey, thereby presenting the data of the electronic document to the requestor in an unsecured manner. According to another embodiment, a key (e.g. K2) can be used to decrypt multiple neighboring key blocks. For example, a key K2 decrypted from $E_{k1}(E_{G1}(K2))$ can be used to decrypt $E_{k2}(E_{G2}(K3))$ and $E_{k2}(E_{G3}(K4))$, wherein $E_{k2}(E_{G2}(K3))$ and $E_{k2}(E_{G3}(K4))$ are two immediate neighboring key blocks, FIG. 5B is a cryptographic structure graph 520 according to another embodiment of the invention. The cryptographic structure graph 520 represents a generalized version of the cryptographic structure graph 500 illustrated in FIG. 5A. The cryptographic structure graph 520 describes how one progresses from a start position in which a request to access a secure electronic document is made to an end position where the secured data from the secure electronic document is unsecured and thus accessible to the requestor.

As shown in FIG. 5B, a user (requestor) would begin at a start node and transition through a first node (N1) or a second node (N2). Then, the user can proceed to a third node (N3) assuming that the user is able to satisfy the requirements of either the first node (N1) or the second node (N2). Hence, in the cryptographic structure graph 520, the first and second nodes N1 and N2 are in a logical "OR" arrangement. Then, if the user is able to satisfy the requirements of the third node (N3), then the user proceeds to a fourth node (N4). If the user is able to satisfy the requirements of the fourth node (N4), then the user is able to gain access to a document key. Then, using the document key, the secured data of the electronic document can be decrypted and thus thereafter utilized by the user. Hence, in order to obtain the document key, the user must satisfy either the first node (N1) or the second node (N2) and also satisfy the third and fourth nodes (N3) and (N4).

In one implementation of the cryptographic structure graph 520, the document key is single encrypted. More particularly, if the user is a member of an appropriate group, the user is permitted to receive an appropriate private key that is utilized to decrypt contents of the first node (N1) or the second node (N2). The private keys used to decrypt the first node (N1) and the second node (N2) are different. Then, the contents of the first node (N1) and the second node (N2) each yield a key that is used to decrypt the third node (N3). Here, the key used to decrypt the third node (N3) can be acquired from either the first node (N1) or the second node (N2). The contents of the third node (N3) then provides a key that is utilized to decrypt the fourth node (N4). The content of the fourth node (N4) then provides the document key that is needed to decrypt the secured data of the electronic document.

Although the arrangement of the cryptographic structure graphs in FIGS. 5A and 5B are the same, it should be recognized that the cryptographic structure graphs are able to have a wide range of arrangements that represent various logical relationships and provide varying levels of cryptographic transformations.

FIG. 5C is a representative header 540 that can be part of a secure electronic file (document) according to one embodiment of the invention. The header 540 includes cryptographic structure information in a format that describes a cryptographic structure graph. The header 540 includes a node list 542, node 1 (N1) 544, node 2 (N2) 546, node 3 (N3) 548, and node 4 (N4) 540. The node list 542 provides a list of the nodes in the encryption structure graph and how they relate (e.g., connect) to one another. Each of the nodes N1, N2, N3 and N4 contains a description of the cryptographic operations associated with such node.

One exemplary implementation of a header that would conform to arrangement of the header 540 illustrated in FIG. 5C is one in which the header can represent the cryptographic structure graphs 500 or 520 illustrated in FIGS. 5A and 5B. Such a header can be described using a descriptive language, such as a markup language (e.g., eXtensible Markup Language (XML)). Such an exemplary header can, for example, be represented by the following description (which is in a markup language format).

```
<Header_Graph>
<Graph_Node_List>
S→N1, S→N2, N1→N3,
N2→N3, N3→N4, N4→DK
</Graph_Node_List>
<N1>
E(K, G1)
</N1>
<N2
E(K, G2)
</N2>
<N3>
E (E (CL, CT1), K)
</N3>
<N4>
E (E (DK, SCL_TS), CL)
</N4>
</Header_Graph>
```

In the above representation, "S" represents a start node, "K" and "CL" are keys, "DK" is a document key (DocKey), "CT1" represents a content type (CT1) permission, "SCL_TS" represents top secret security clearance level, and "E" designates encryption. It should be noted that the notion in FIG. 5A is similar to that contained in the representative markup language, e.g., "$E_K(E_{CT1}(CL))$" at node 506 can also be represented in the markup language as "E (E (CL, CT1), K)."

Figure 5D:
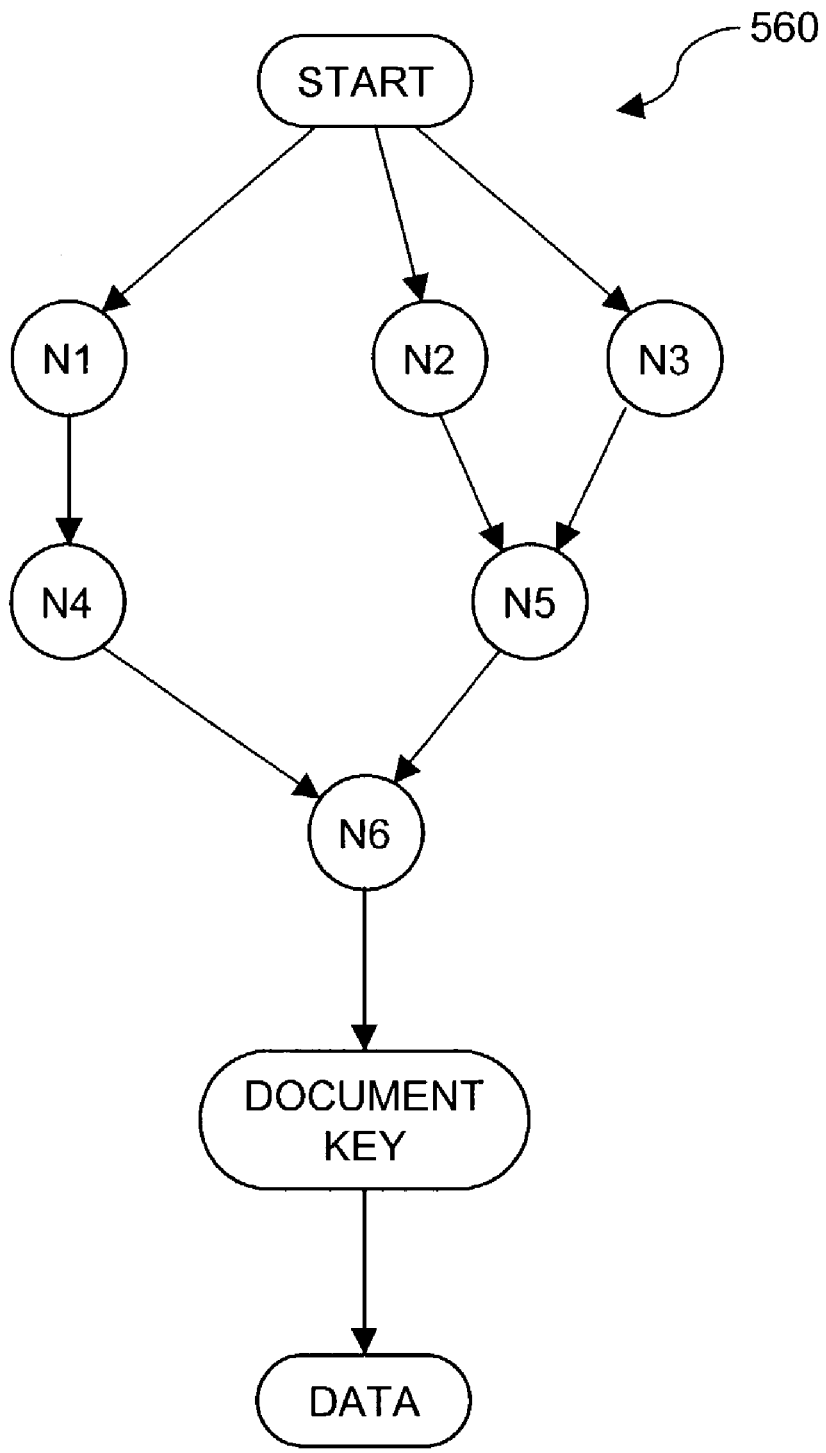
FIG. 5D is a cryptographic structure graph according to still another embodiment of the invention.

The cryptographic structure graphs according to the invention can implement a wide range of cryptographic transformations using a combination of "AND" and "OR" operations within a structure. FIG. 5D is a cryptographic structure graph 560 according to still another embodiment of the invention. The exemplary cryptographic structure graph 560 includes six nodes and various paths through the cryptographic structure graph 560 can be used to acquire a document key. The cryptographic structure graph 560 has a format that is generally similar to the cryptographic structure graph 520 illustrated in FIG. 5B, though the cryptographic structure graph 560 represents a more complex relationship of cryptographic transformations.

One exemplary implementation of a header that would conform to arrangement of the cryptographic structure graph 560 illustrated in FIG. 5D is provided below. Such a header can be described using a descriptive language, such as a markup language (e.g., eXtensible Markup Language (XML)). Such an exemplary header can, for example, be represented by the following description (which is in a markup language format).

```
<Header_Graph>
<Graph_Node_List>
S→N1, S→N2, S→N3,
N1→N4, N2→N5, N3→N5,
N4→N6, N5→N6, N6→DK
</Graph_Node_List>
<N1>
E (K_a, G1)
</N1>
<N2>
E (K_b, G2)
</N2>
<N3>
E (K_b, G3)
</N3>
<N4>
E (E (K_c, G4), K_a)
</N4>
<N5>
E (E (K_c, G5), K_b)
</N5>
<N6>
E (E (DK, G6), K_c)
<N6>
</Header_Graph>
```

In the above representation, "S" represents a start node, "K_x" represent keys, "Gx" represents access rules (group membership), "DK" is a document key (DocKey), and "E" designates encryption.

Figure 6A:
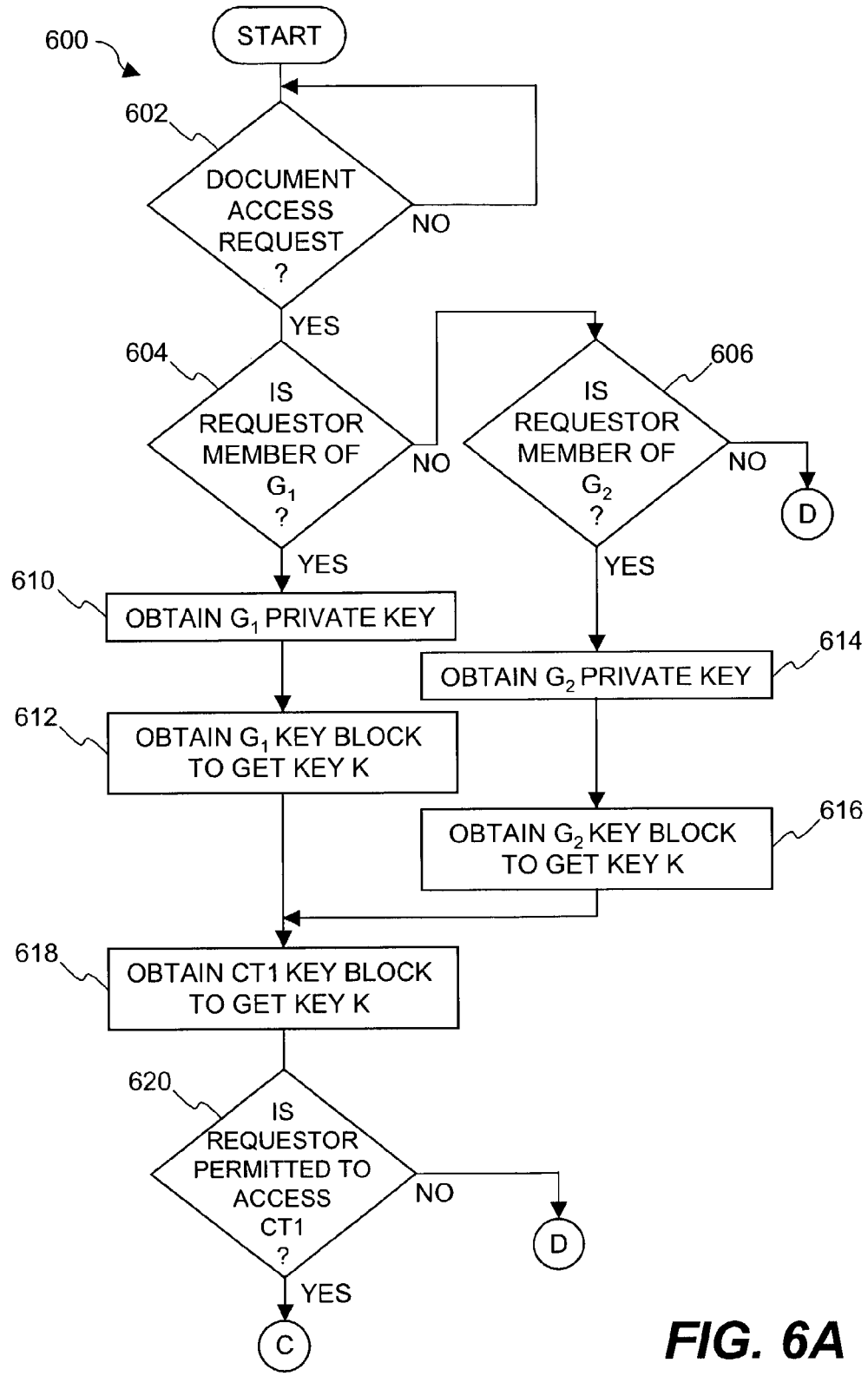
FIGS. 6A and 6B are flow diagrams of secure file access processing according to one embodiment of the invention.
Figure 6B:
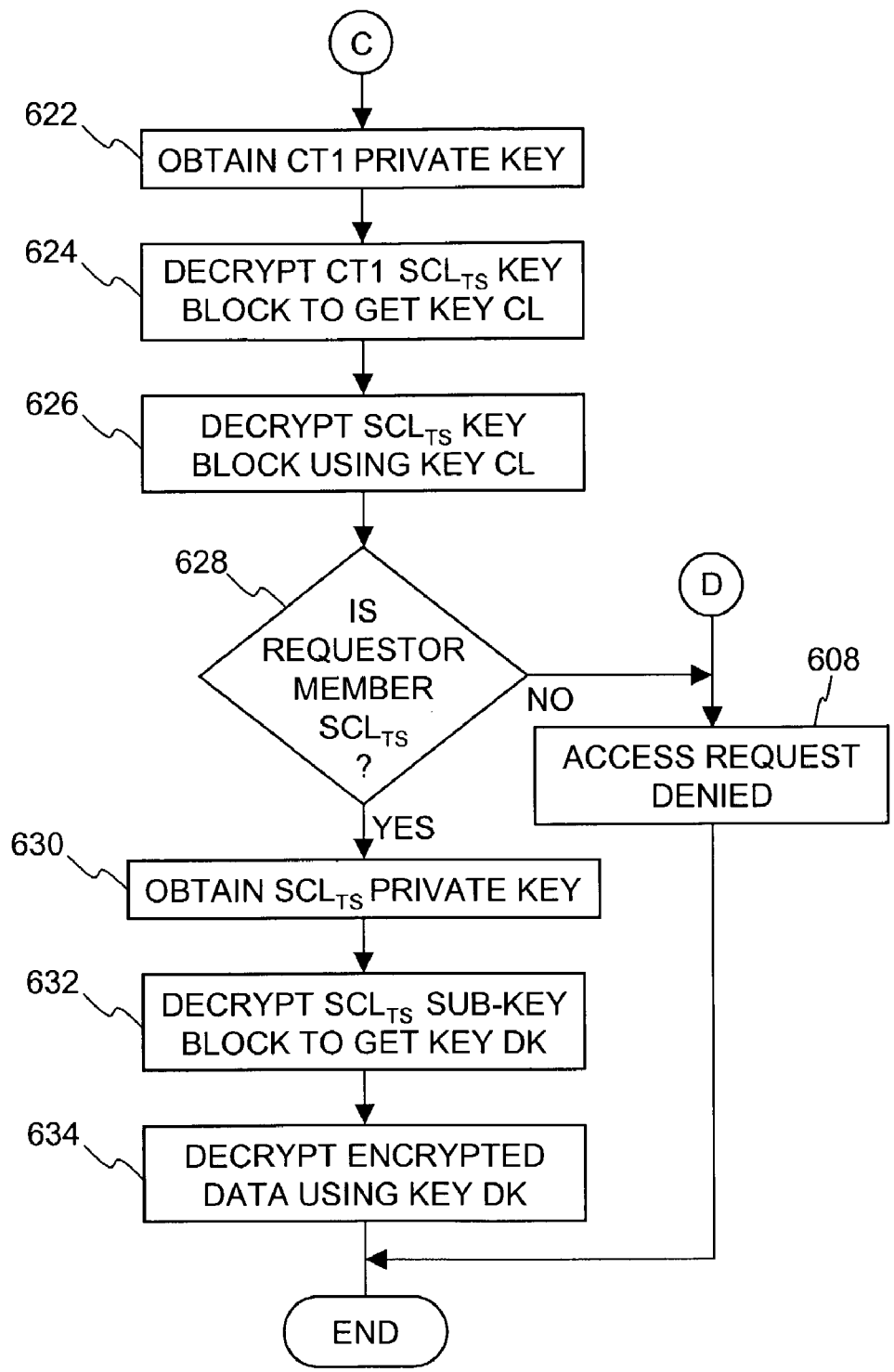

FIGS. 6A and 6B are flow diagrams of secure file access processing 600 according to one embodiment of the invention. The secure file access processing 600 represents processing that is performed to an electronic file that is secured by multiple layers of encryption in accordance with a cryptographic structure graph, namely, the encryption structure graph 500 illustrated in FIG. 5A.

The secure file access processing 600 begins with a decision 602 that determines whether a document access request has been received. When the decision 602 determines that a document access request has not yet been received, the secure file access processing 600 awaits such a request. Once the decision 602 determines that a document access request has been received, a decision 604 determines whether the requestor is a member of group G1. When the decision 604 determines that the requestor is not a member of group Cl, then a decision 606 determines whether the requestor is a member of group G2. When the decision 606 determines that the requestor is not a member of group G2, then the request to access the secured file is denied 608.

When the decision 604 determines that the requestor is a member of group G1, then a group G1 private key is obtained 610. Then, a group G1 key block is decrypted 612 to obtain a key K. Alternatively, when it is determined 604 that the requestor is not a member of group G1 but is a member of group G2, then a group G2 private key is obtained 614. A group G2 key block is then decrypted 616 to obtain the key K. Hence, regardless of whether the requestor is a member of group G1 or group G2, the key K is obtained.

Next, following operations 612 or 616, a K key block is decrypted 618 using the key K to obtain a content type (CT1) sub-key block. Then, a decision 620 determines whether the requestor is permitted to access the secure electronic document based on whether the requestor has sufficient privileges to access documents having the content type (CT1). When the decision 620 determines that the requestor does not have sufficient privileges to access documents of the content type (CT1), then access to the requested secure electronic document is denied 608. Alternatively, when the decision 620 determines that the requestor is permitted to access documents having the content type (CT1), a content type (CT1) private key is obtained 622. Then, a content type (CT1) sub-key block is decrypted 624 to obtain a key clearance level (CL). Using the key CL, a CL key block is decrypted 626 using the key CL to obtain a top secret security clearance level ($SCL_{TS}$) sub-key block.

Thereafter, a decision 628 determines whether the requestor is a member of the top secret security clearance level ($SCL_{TS}$). In other words, does the requestor have permission to access top secret documents. When the decision 628 determines that the requestor does not have top secret security clearance, then the request to access the secure electronic document is denied 608. On the other hand, when the requestor does have top secret security clearance, then a top secret security clearance level ($SCL_{TS}$) private key is obtained 630. Then, a top secret security clearance level ($SCL_{TS}$) sub-key block is decrypted 632 using the top secret security clearance level ($SCL_{TS}$) private key, thereby obtaining a key DK. The key DK is also referred to as a document key (or DocKey). Finally, the encrypted data of the secure electronic document is decrypted 634 using the key DK.

Following the operation 634, the secure file access processing 600 is complete and ends with the requestor gaining access to the data of the secure electronic document. On the other hand, following the operation 608, the secure file access processing 600 is also complete and ends, though the requestor is denied access to the secured data of the secure electronic document.

Figure 7A:
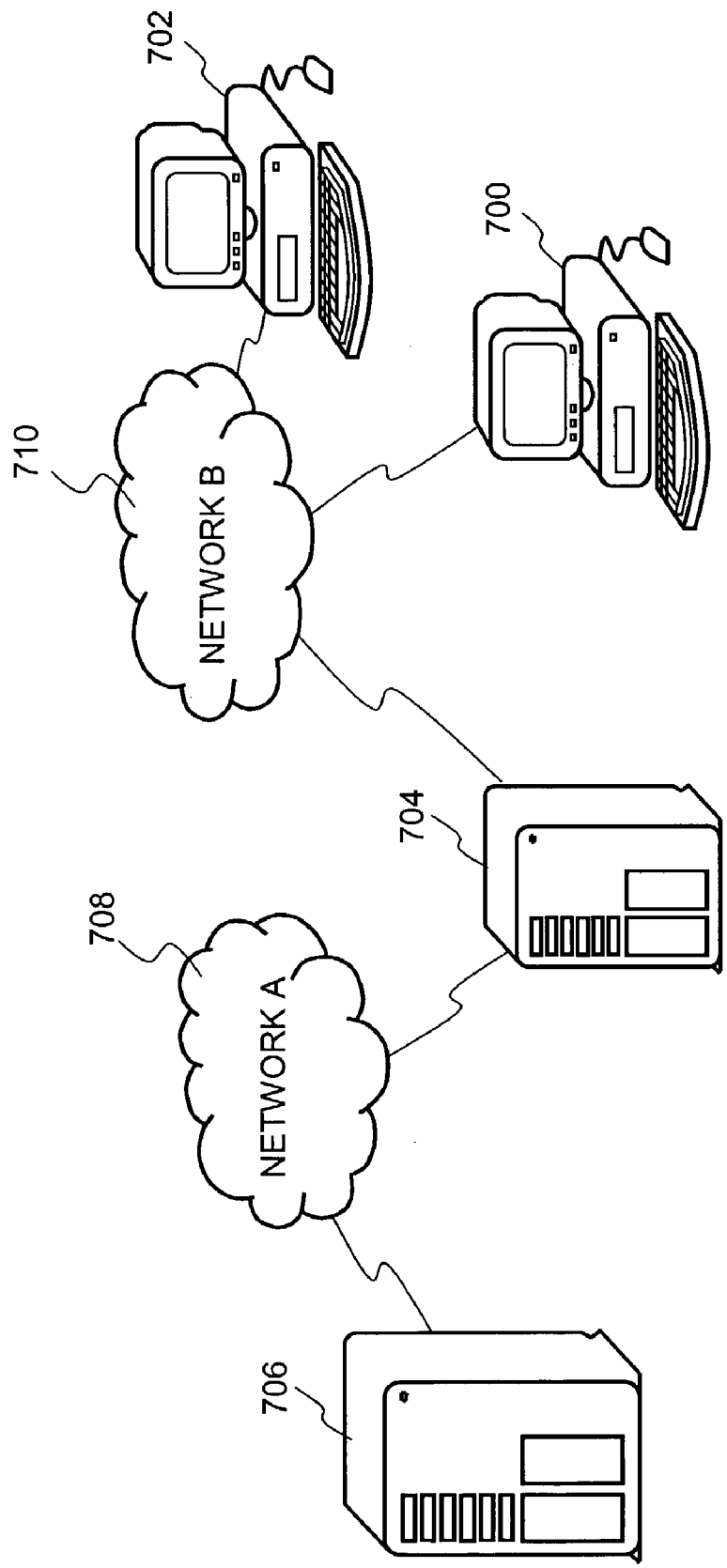

FIG. 7A shows a basic system configuration in which the present invention may be practiced in accordance with one embodiment thereof. Documents or files may be created using an authoring tool executed on a client computer 700, which may be a desktop computing device, a laptop computer, or a mobile computing device. Exemplary authoring tools may include application programs such as Microsoft Office (e.g., Microsoft Word, Microsoft PowerPoint, and Microsoft Excel), Adobe FrameMaker and Adobe Photoshop.

According to one embodiment, the client computer 700 is loaded with a client module that is capable of communicating with a server 704 or 706 over a data network (e.g., the Internet or a local area network). According to another embodiment, the client computer 700 is coupled to the server 704 through a private link. As will be further explained below, a document or file created by an authoring tool can be secured by the client module. The client module, when executed, is configured to ensure that a secured document is secured at all times in a store (e.g., a hard disk or other data repository). The secured documents can only be accessed by users with proper access privileges. In general, an access privilege or access privileges for a user may include, but not be limited to, a viewing permit, a copying permit, a printing permit, an editing permit, a transferring permit, an uploading/downloading permit, and a location permit.

According to one embodiment, a created document is caused to go through an encryption process that is preferably transparent to a user. In other words, the created document is encrypted or decrypted under the authoring application so that the user is not aware of the process. One or more keys, such as a user key and a content type key, can be used to retrieve a file key to decrypt an encrypted document. Typically, the user key is associated with an access privilege for the user or a group of users, and the content type key is associated with the type of content of the created document. For a given secured document, only a user with proper access privileges can access the secured document.

In one setting, a secured document may be uploaded via the network 710 from the computer 700 to a computing or storage device 702 that may serve as a central repository. Although not necessary, the network 710 can provide a private link between the computer 700 and the computing or storage device 702. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computer 700 may be remotely accessed.

In another setting, the computer 700 and the computing or storage device 702 are inseparable, in which case the computing or storage device 702 may be a local store to retain secured documents or receive secured network resources (e.g., dynamic Web contents, results of a database query, or a live multimedia feed). Regardless of where the secured documents or secured resources are actually located, a user, with proper access privileges, can access the secured documents or resources from the computer 700 or the computing or storage device 702 using an application (e.g., Internet Explorer, Microsoft Word or Acrobat Reader).

The server 704, also referred to as a local server, is a computing device coupled between a network 708 and the network 710. According to one embodiment, the server 704 executes a local version of a server module. The local version is a localized server module configured to service a group of designated users or client computers, or a location. Another server 706, also referred to as a central server, is a computing device coupled to the network 708. The server 706 executes the server module and provides centralized access control management for an entire organization or business. Accordingly, respective local modules in local servers, in coordination with the central server, form a distributed mechanism to provide distributed access control management. Such distributed access control management ensures the dependability, reliability and scalability of centralized access control management undertaken by the central server for an entire enterprise or a business location.

Figure 7B:
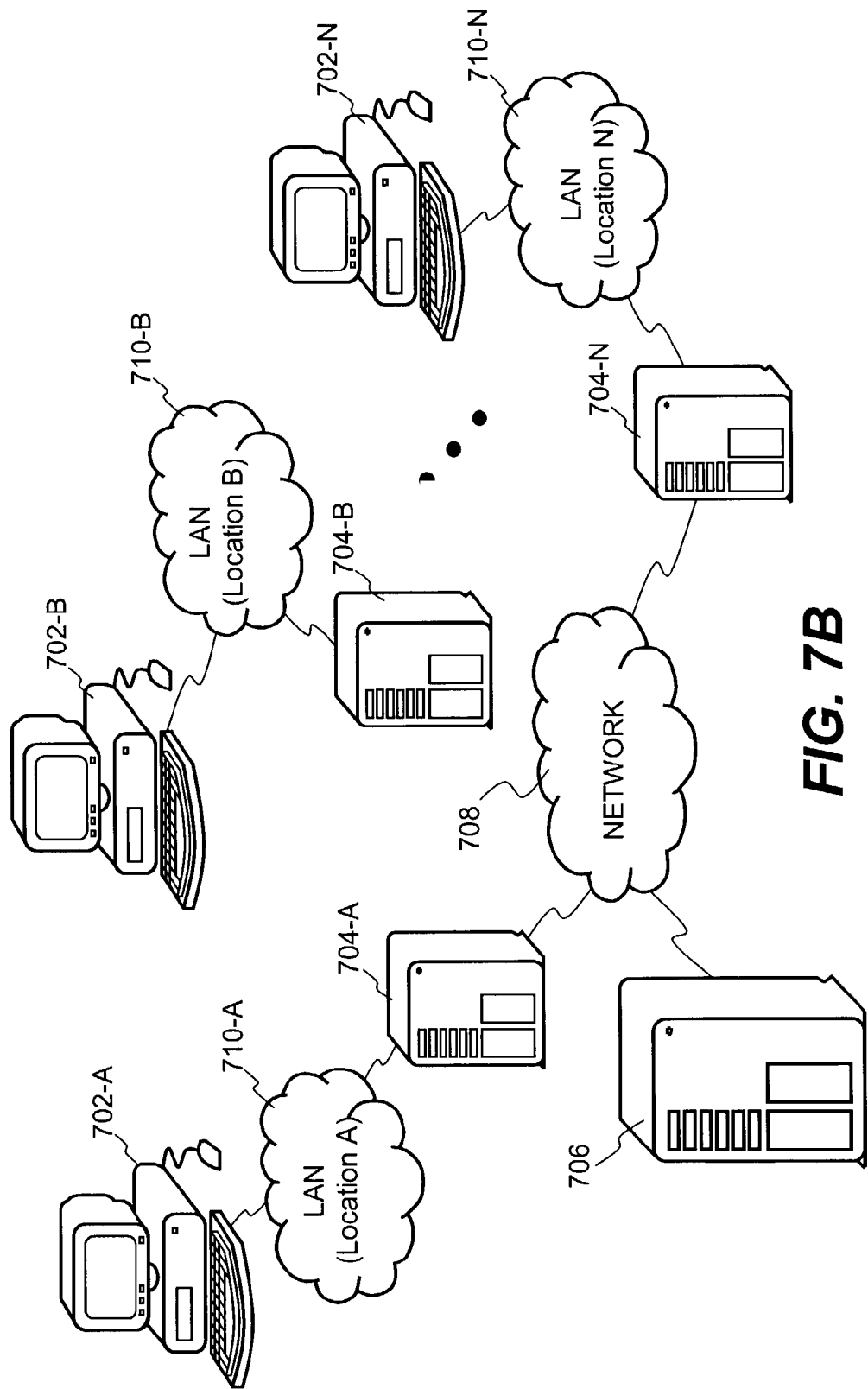

FIG. 7B shows another system configuration in which the invention may be practiced in accordance with an embodiment thereof. Here, the configuration employs a central server and local servers. The configuration may correspond to a large enterprise having multiple geographic locations or offices. A central server 706 maintains a database managing the access privileges and the access rules in the entire enterprise. One of the features in this configuration is the underlying capability to provide fault tolerance and efficient AC (Access Control) management for a large group of users. Instead of having the central server 706 performing the AC management for each of the users at one single location, a number of local servers 704 (e.g., 704-A, 704-B, . . . 704-N) are employed in a distributed manner to service the individual locations or offices. Each of local servers 704 executes a local module derived or duplicated from the server module being executed at the central server 706 to manage those users who are local to respective local servers 704. The central server 706 can centralize the AC management in addition to managing the users if necessary.

According to one embodiment, a local module can be a customized version of the server module that runs efficiently for only a few locations or a group of users. For example, a local server 704-A is only responsible for the users or computers 702-A in location A, while a local server 704-B is only responsible for the users or computers 702-B in location B. As a result, even if the central server 706 has to be taken down for maintenance or is not operational at the time a user needs to access secured documents, the access control will not be disrupted. The detailed operation of the local servers 704 in cooperation with the central server 706 will be further described below.

According to another embodiment, a local module is a replicated version of the server module and exchanges any updates with the server module when connected (e.g., periodically or at request). Depending on implementation, part or all of the server module can be duplicated in a local server to ensure that communications with users or their client machines are efficient and fault tolerant. As a result, even if the central server 706 has to be taken down for maintenance or is not operational at the time a user needs to access secured documents, the access control will not be disrupted. For example, in such a situation, any of the local servers 704 can step up and take the place of the central server. When the central server 706 is running or communicating with the local servers 704, information collected at the respective local servers about the users or their activities is sent back to the central server 706. The detailed operation of the local servers 704 in cooperation with the central server 706 in this regard will also be further provided below.

FIG. 7C shows still another system configuration in which the invention may be practiced in accordance with an embodiment thereof. This configuration is suitable for a small group of users. In this configuration, no local servers are employed. A server computer 712 is loaded with the server module and each of the users or terminal computers 716 (only one is shown therein) is loaded with a client module. The users or the terminal computers 716 couple to the server computer 712 through a local area network. The server computer 712 performs the AC management for each of the users or the terminal computers 716.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include tangible storage media such as read-only memory, random-access memory, CD-ROMs, DVDs, magnetic tape, and optical data storage devices. The computer readable medium excludes carrier waves and signals. The tangible computer readable storage medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that cryptographic transformations used to secure electronic files (e.g., electronic documents) can be flexibly assigned and thus vary with different users, applications, and/or needs. Another advantage of the invention is that a description of cryptographic transformations used to secure an electronic file (e.g., electronic document) can be provided within the secured electronic file. Still another advantage of the invention is that a cryptographic structure graph can be used to describe those cryptographic transformations that are assigned to secure an electronic file (e.g., electronic document).

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A computer-implemented method comprising:
in response to a request from a requestor, obtaining security information from a header of a secure electronic file, the security information including at least encryption structure information, access rules to control access to the secure electronic file, user groups that are authorized to access the secure electronic file, and secrets used to decrypt the secure electronic file, wherein the secrets are associated with the user groups and security clearance levels authorized to access the secure electronic file, and wherein the access rules limit the availability of the secrets to requestors that:
   are members of a user group that is authorized to access the secure electronic file; and
   possess a security clearance level authorized to access the secure electronic file, wherein the security clearance level is associated with a content type and a confidentiality level of the secure electronic file;
attempting to decrypt, by a computing device, at least secure data of the secure electronic file for access by the requestor based on the encryption structure information, the access rules, the user groups, and the secrets; and
unsecuring, by the computing device, the secure data for access by the requestor in response to determining that at least the secure data of the secure electronic file is successfully decrypted.

2. The computer-implemented method as recited in claim 1, wherein the encryption structure information interrelates the access rules, the user groups, and the secrets to describe a multi-stage cryptographic process.

3. The computer-implemented method as recited in claim 2, wherein the encryption structure information is expressed in a markup language.

4. The computer-implemented method as recited in claim 2, wherein the encryption structure information is a representation of an alterable encryption structure graph that represents the multi-stage encryption process that has been used to secure at least the secure data of the secure electronic file.

5. The computer-implemented method as recited in claim 4, wherein the encryption structure graph is configured such that it comprises a plurality of nodes, each node requiring a successful decryption process to progress to a next node.

6. The computer-implemented method as recited in claim 2, wherein one of the secrets is a file key that decrypts the secure electronic file, and wherein the file key is protected by multiple stages of encryption.

7. The computer-implemented method as recited in claim 6, wherein attempting to decrypt, by the computing device, at least the secure data of the secure electronic file undoes the multiple stages of encryption to obtain the file key, and unsecuring the secure data for access by the requestor uses the file key to decrypt at least the secure data of the secure electronic file.

8. The computer-implemented method as recited in claim 1, wherein the secrets included in the security information are themselves encrypted.

9. The computer-implemented method as recited in claim 1, wherein the encryption stricture information is expressed in a markup language.

10. The computer-implemented method as recited in claim 1, wherein the encryption structure information represents an encryption structure that has been used to secure at least the secure data of the secure electronic file.

11. The computer-implemented method as recited in claim 1, wherein the encryption structure information represents an encryption structure graph that represents the multi-stage encryption process used to secure at least the secure data of the secure electronic file.

12. The computer-implemented method as recited in claim 11, wherein the encryption structure graph is configured such that it comprises a plurality of nodes, each node requiring a successful decryption process to progress to a next node.

13. A tangible computer-readable medium having computer-executable instructions stored thereon for controlling-access to a secure electronic file, the instructions comprising:
in response to a request from a requestor, instructions to obtain security information from the header of a secure electronic file, the security information including at least encryption structure information, access rules to control access to the secure electronic file, user groups that are authorized to access the secure electronic file, and secrets used to decrypt the secure electronic file, wherein the secrets are associated with the user groups and security clearance levels authorized to access the secure electronic file, and wherein the access rules limit the availability of the secrets to requestors that:
are members of a user group that is authorized to access the secure electronic file; and
possess a security clearance level authorized to access the secure electronic file, wherein the security clearance level is associated with a content type and a confidentiality level of the secure electronic file;
instructions to attempt to decrypt at least the secure data of the secure electronic file for access by the requestor based on the encryption structure information, the access rules, the user groups, and the secrets; and
instructions to unsecure the secure data for access by the requestor in response to determining that at least the secure data of the secure electronic file is successfully decrypted.

14. A system, comprising:
a client device configured to produce a secure electronic file through a multi-stage encryption process, wherein the secure electronic file includes secure data that is secured by encryption and a header portion including at least security information, the security information including at least encryption structure information, access rules to control access to the secure electronic file, user groups that are authorized to access the secure electronic file, and secrets used to decrypt the secure electronic file, wherein the secrets are associated with the user groups and security clearance levels authorized to access the secure electronic file, and wherein the access rules limit the availability of the secrets to requestors that:
are members of a user group that is authorized to access the secure electronic file; and
possess a security clearance level authorized to access the secure electronic file, wherein the security clearance level is associated with a content type and a confidentiality level of the secure electronic file;
wherein the encryption structure information interrelates the access rules, the user groups, and the secrets to describe the multi-stage encryption process or decryption thereof performed by the client device.

15. The system as recited in claim 14, wherein the secure electronic file is created by an authoring device.

16. A computer-implemented method for securing a plurality of electronic files through a multi-stage encryption process to produce a plurality of secure electronic files, wherein each of the plurality of secure electronic files has a header and data portion, the method comprising:
encrypting, by a computing device, the data portion of the plurality of secure electronic files; and
formatting, by the computing device, the header portion of the plurality of secure electronic files to include at least security information, wherein the security information includes at least encryption structure information, access rules to control access to the plurality of secure electronic files, user groups that are authorized to access the plurality of secure electronic files, and secrets used to decrypt the plurality of secure electronic files, wherein the secrets are associated with the user groups and security clearance levels authorized to access the plurality of secure electronic files, and wherein the access rules limit the availability of the secrets to requestors that:
are members of a user group that is authorized to access the plurality of secure electronic files; and
possess a security clearance level authorized to access the plurality of secure electronic files, wherein the security clearance level is associated with respective content types and confidentiality levels of the plurality of secure electronic files;
wherein the encryption structure information interrelates the access rules, the user groups, and the secrets to describe the multi-stage encryption process or decryption thereof.

17. The computer-implemented method as recited in claim 16, wherein the data portion is decrypted with a first key, and wherein the secrets are encrypted.

18. The computer-implemented method as recited in claim 17, wherein the secrets are keys, and wherein one of the secrets is the first key.

19. The computer-implemented method as recited in claim 17, wherein the multi-stage encryption structure information protects the first key.

20. The method as recited in claim 16, wherein the access rules are encrypted and are decrypted, by the computing device, with a key associated with a user group corresponding to a particular requestor attempting to gain access to one of the plurality of secure electronic files.

21. The computer-implemented method as recited in claim 16, wherein the access rules are expressed in a descriptive language.

22. The computer-implemented method as recited in claim 21, wherein the descriptive language is a markup language.

23. The computer-implemented method as recited in claim 16, wherein the encryption structure information is expressed in a descriptive language.

24. The computer-implemented method as recited in claim 23, wherein the descriptive language is a markup language.

25. The computer-implemented method as recited in claim 17, wherein the secrets comprise at least a protection key that is secured by at least one of the access rules, wherein the protection key is needed to access the first key.

26. The computer-implemented method as recited in claim 17, wherein the data portion is decrypted, by the computing device, with a first key, and wherein the secrets include at least the first key and a second key, wherein the second key is used in decrypting the first key which is provided in the header portion in an encrypted format.

27. The computer-implemented method as recited in claim 26, wherein the second key is provided to a particular requestor attempting to gain access to one of the plurality of secure electronic files in response to determining that the particular requestor is affiliated with a group that is permitted by at least one of the access rules to acquire the second key.

28. The computer-implemented method as recited in claim 26, wherein each of the plurality of secure electronic files has a content type, wherein the secrets further comprise a third key, and wherein the particular requestor gains access to the third key in response to deter mining that the particular requestor possesses a security clearance level authorized to access electronic files of the content type.

29. The computer-implemented method as recited in claim 28 wherein the secrets further comprise a fourth key, and wherein the particular requestor gains access to the fourth key in response to determining that the particular requestor possesses a sufficient security clearance level as compared to a confidentiality level assigned to one of the plurality of secure electronic files.

30. The computer-implemented method as recited in claim 29, wherein the first key is encrypted in a serial manner by the second, third and fourth keys.

31. The computer-implemented method as recited in claim 29, wherein the particular requestor gains access to the fourth key in response to determining that the particular requestor possesses the sufficient security clearance level.

32. The computer-implemented method as recited in claim 16, wherein the encryption structure information is a representation of an encryption structure that has been used to secure at least the data portion of the plurality of secure electronic files.

33. The computer-implemented method as recited in claim 16, wherein the encryption structure information is an encryption structure graph that represents the multi-stage encryption process used to secure at least the data portion of the plurality of secure electronic files.

34. The computer-implemented method as recited in claim 33, wherein the encryption structure graph includes a plurality of nodes, each node requiring a successful decryption process to progress to a next node.

35. The computer-implemented method as recited in claim 16, wherein the plurality of electronic files comprise word processing documents.

* * * * *

UNITED STATES PATENT AND TRADEMARK OFFICE
CERTIFICATE OF CORRECTION

PATENT NO. : 7,930,756 B1  
APPLICATION NO. : 10/404566  
DATED : April 19, 2011  
INVENTOR(S) : Crocker et al.

Page 1 of 1

It is certified that error appears in the above-identified patent and that said Letters Patent is hereby corrected as shown below:

Title page 6, item (56), under "Other Publications", in Column 1, Line 1, delete "Coporate" and insert -- Corporate --.

Title page 6, item (56), under "Other Publications", in Column 1, Line 4, delete "199," and insert -- 1999, --.

Title page 6, item (56), under "Other Publications", in Column 1, Line 6, delete "Alan" and insert -- Alain --.

Title page 6, item (56), under "Other Publications", in Column 1, Line 7, delete "Digtal" and insert -- Digital --.

Title page 6, item (56), under "Other Publications", in Column 1, Line 11, delete "Michio," and insert -- Michio Ouye, --.

Title Page 7, item (56), under "Other Publications", in Column 2, Line 39, below "Office Action, dated Oct. 5, 2005, for European Patent Application No. 02258532.7, 5 pgs." insert -- Office Action, dated Dec. 5, 2006, for European Patent Application No. 02258532.7, 5 pgs. --.

Column 17, line 22, in Claim 9, delete "stricture" and insert -- structure --.

Column 17, lines 38-39, in Claim 13, delete "controlling-access" and insert -- controlling access --.

Column 18, line 65, in Claim 20, delete "method" and insert -- computer-implemented method --.

Column 19, line 34, in Claim 28, delete "deter mining" and insert -- determining --.

Signed and Sealed this  
Ninth Day of August, 2011

David J. Kappos  
*Director of the United States Patent and Trademark Office*